United States Patent [19]

Smidler

[11] Patent Number: 5,730,578

[45] Date of Patent: Mar. 24, 1998

[54] LIFTING MECHANISM FOR A DECK SYSTEM

[75] Inventor: Francis S. Smidler, Lafayette, Ind.

[73] Assignee: Wabash National Corporation, Lafayette, Ind.

[21] Appl. No.: 565,442

[22] Filed: Nov. 30, 1995

Related U.S. Application Data

[63] Continuation-in-part of Ser. No. 389,205, Feb. 15, 1995.

[51] Int. Cl.⁶ .................................................. B60P 1/02
[52] U.S. Cl. ............................ 414/495; 410/4; 410/24
[58] Field of Search .............................. 414/495, 537, 414/333, 482, 474–476; 410/4, 24, 26, 77, 81; 187/214, 216, 244, 252, 267, 268

[56] References Cited

U.S. PATENT DOCUMENTS

| 448,788 | 3/1891 | Pratt | 187/252 |
|---|---|---|---|
| 1,573,172 | 2/1926 | Laffey | 414/495 X |
| 2,659,318 | 11/1953 | Steins et al. | 414/495 X |
| 2,668,734 | 2/1954 | Bridge | |
| 2,843,223 | 7/1958 | Villars | 187/214 X |
| 3,043,454 | 7/1962 | Butler et al. | 410/26 |
| 4,232,986 | 11/1980 | Johnson | 414/495 X |
| 4,685,721 | 8/1987 | Banerjea | 296/181 |
| 4,701,086 | 10/1987 | Thorndyke | 410/26 |
| 4,801,229 | 1/1989 | Hanada et al. | 410/26 |
| 4,806,061 | 2/1989 | Fenton | 414/475 |
| 4,810,027 | 3/1989 | Ehrlich | 296/181 |
| 4,881,859 | 11/1989 | Ehrlich | 410/29.1 |
| 5,040,466 | 8/1991 | Wicks et al. | 105/4.3 |

FOREIGN PATENT DOCUMENTS

| 7827146 | 9/1976 | Germany | |
|---|---|---|---|
| 8800538 | 1/1988 | WIPO | 414/495 |
| 8808385 | 11/1988 | WIPO | 414/495 |
| 9402337 | 2/1994 | WIPO | 414/495 |

*Primary Examiner*—David A. Bucci
*Attorney, Agent, or Firm*—Trexler, Bushnell, Giangiorgi & Blackstone, Ltd.

[57] ABSTRACT

A trailer for hauling cargo, such as general freight, automobiles, small trucks and the like, has a deck element therein. The deck element is capable of being raised or lowered by a lifting assembly to a variety of positions within the trailer and can be secured to side walls of the trailer by cammed bracket members. A guide assembly is provided to prevent forward and rearward movement of the deck element during transportation of the trailer. The trailer can be tilted backwards until a back end of the trailer contacts the ground so that cargo can be easily loaded into the trailer. Cargo can be loaded onto the deck element and underneath the deck element on the floor of the trailer. The lifting assembly is substantially horizontally arranged along the top of the trailer so that when automobiles are loaded onto the deck element and the deck element is raised, the lifting assembly does not interfere with the space occupied by the automobiles.

15 Claims, 15 Drawing Sheets

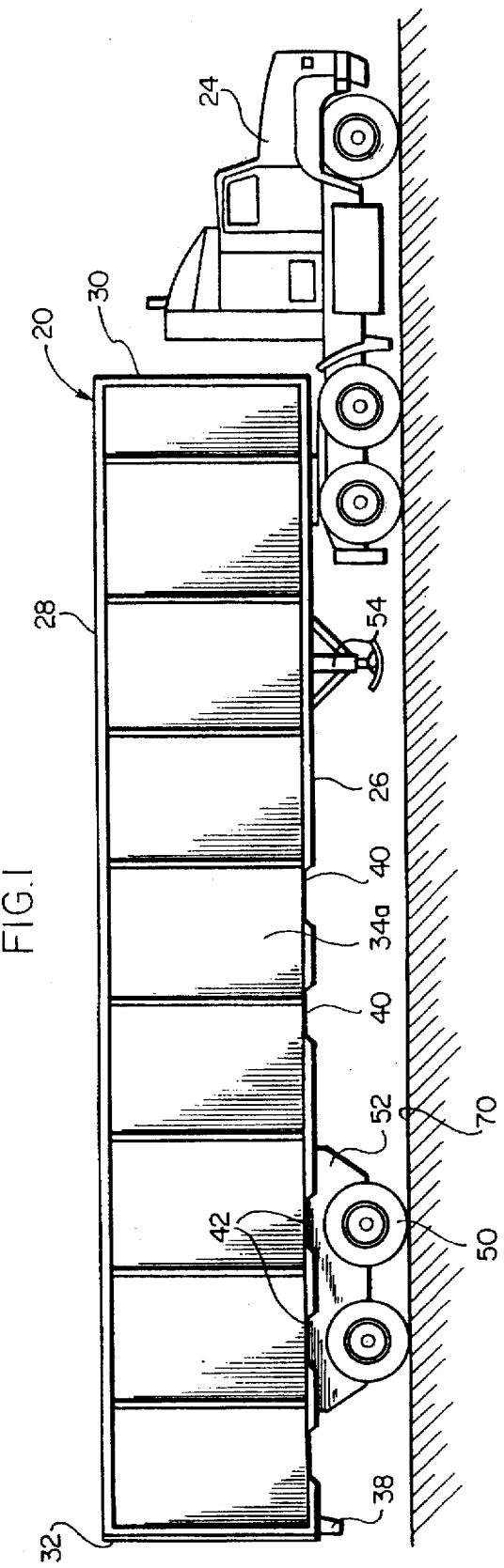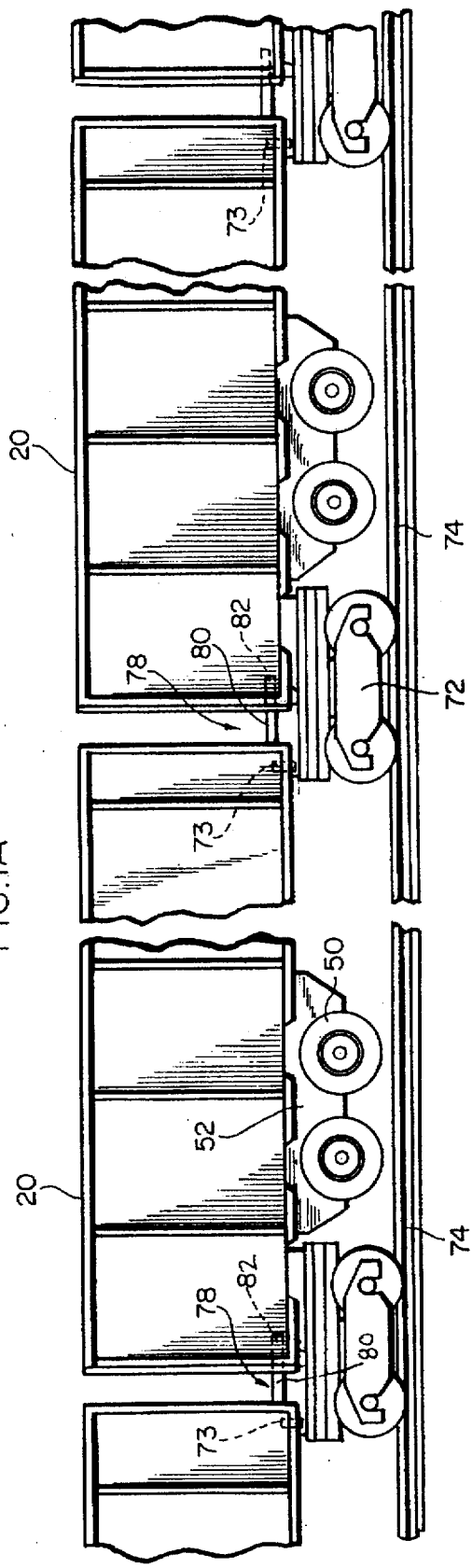

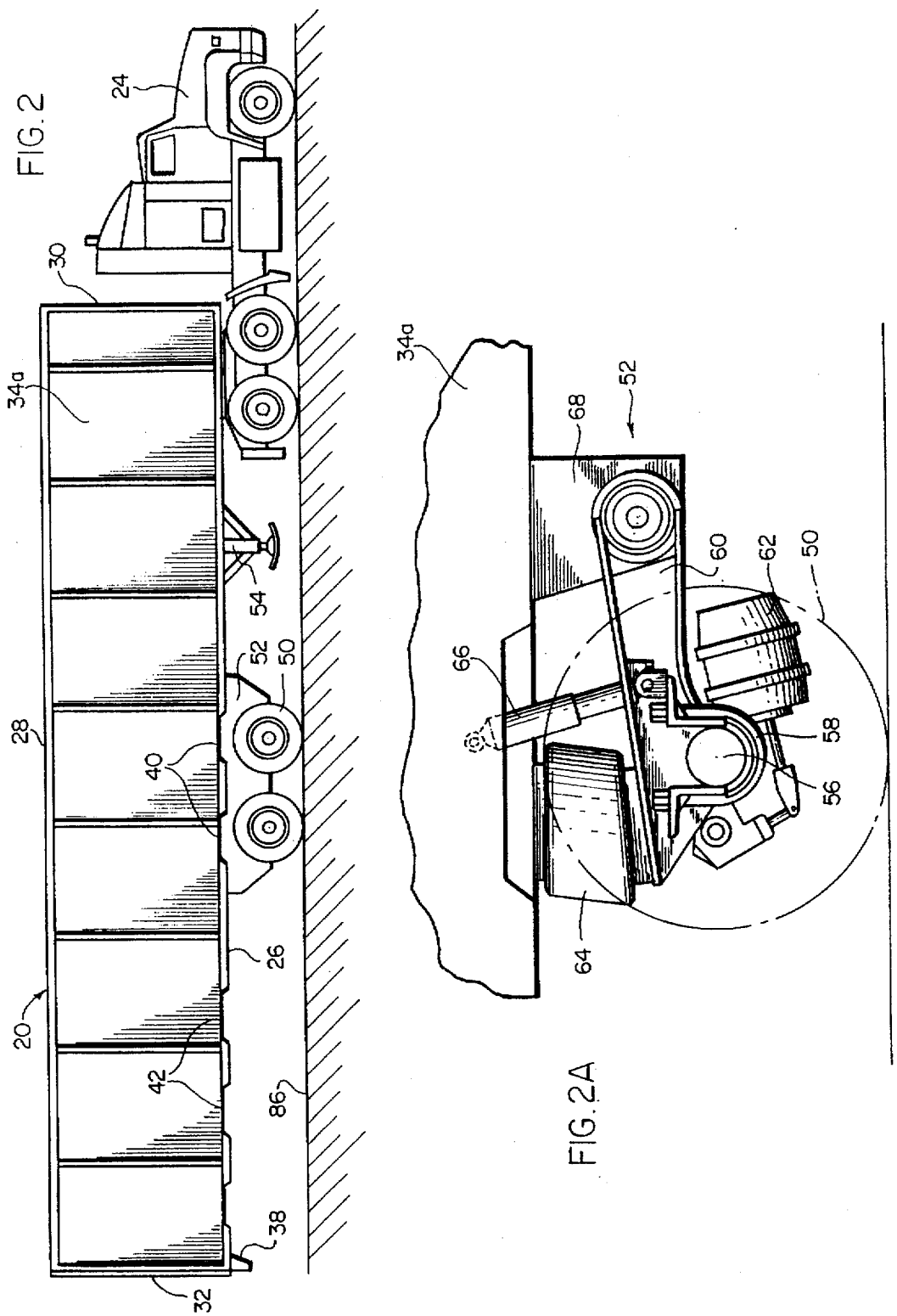

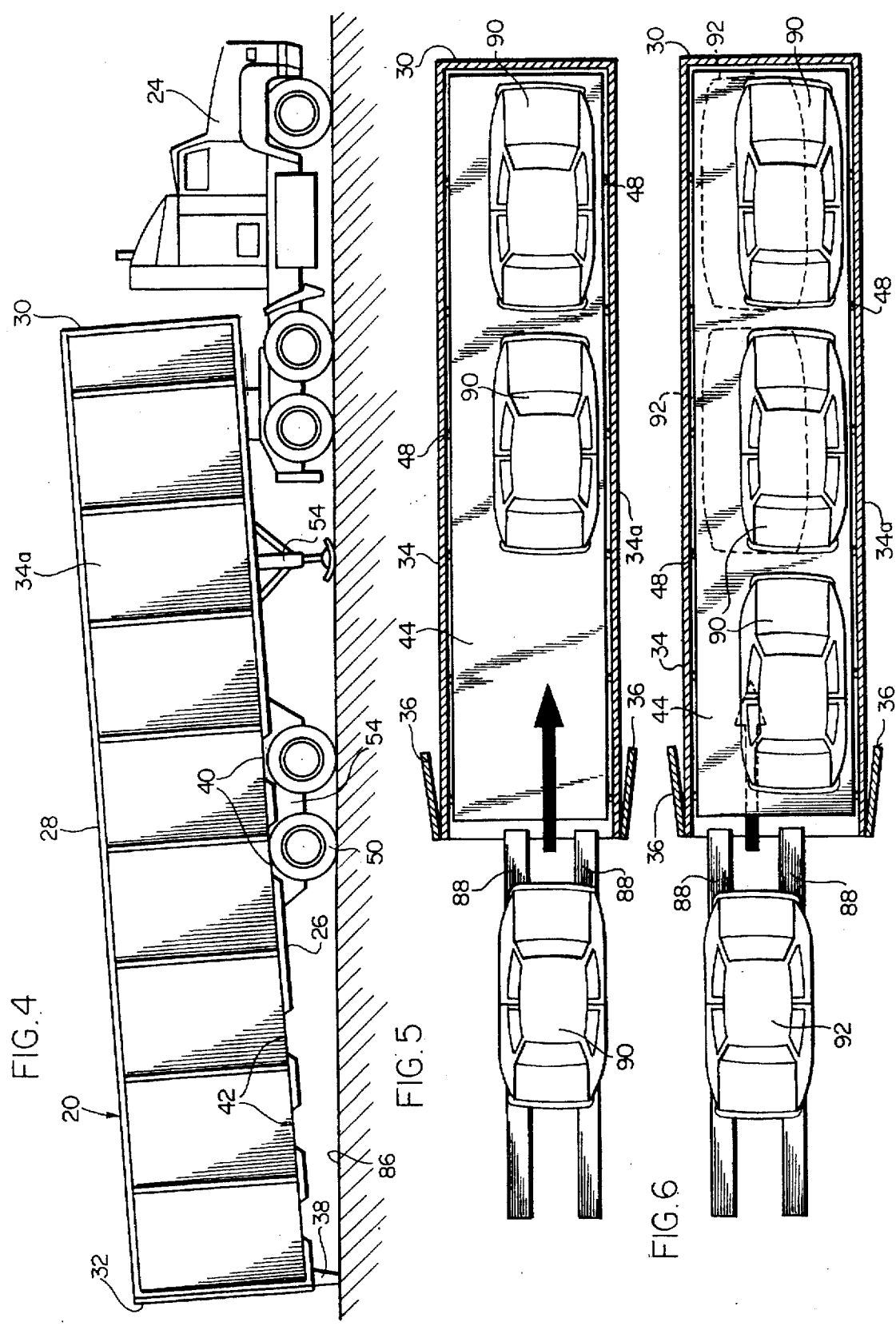

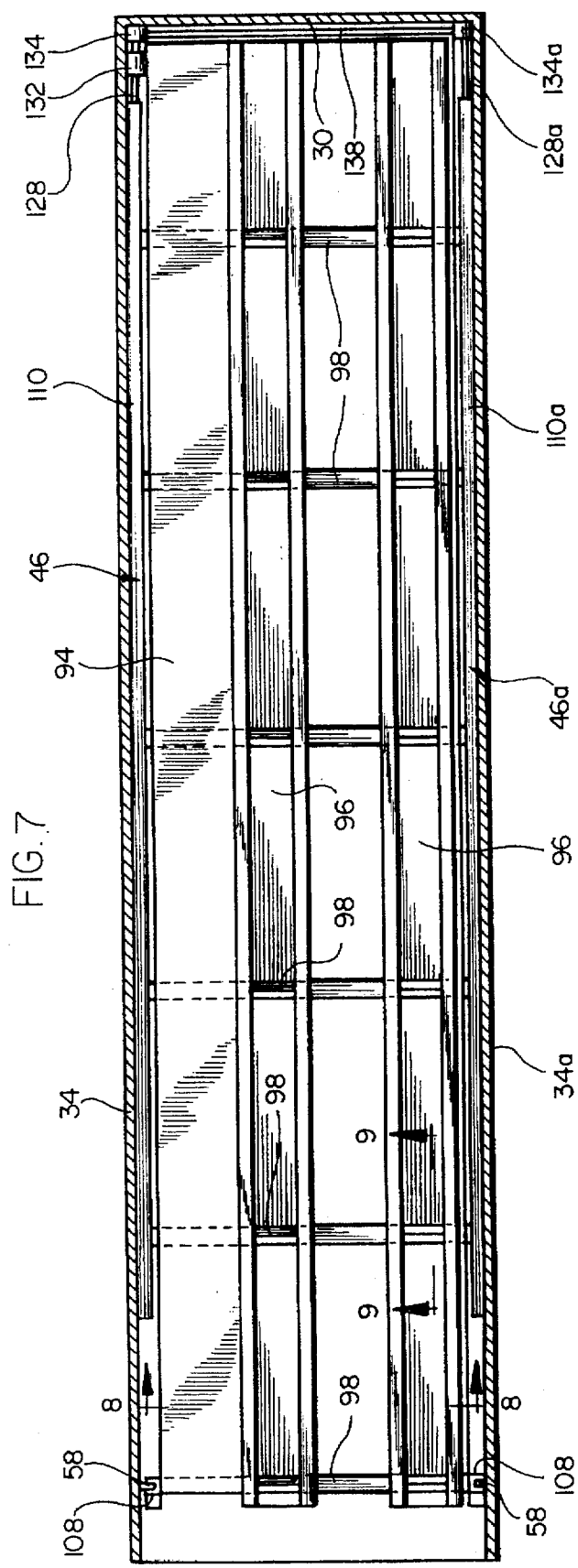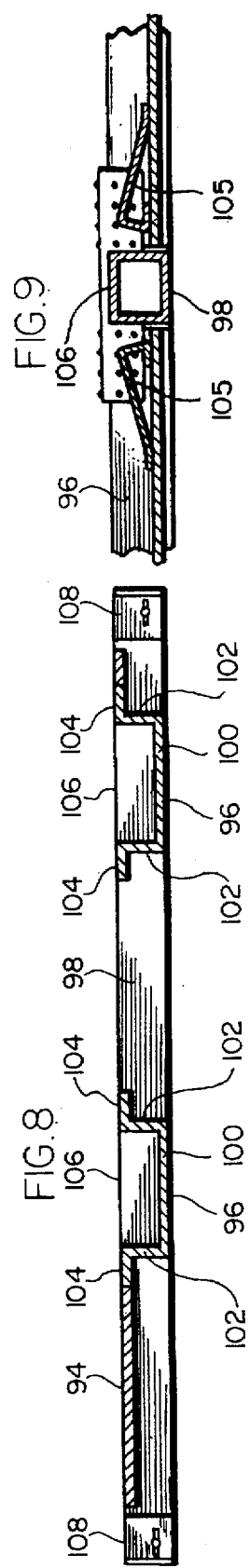

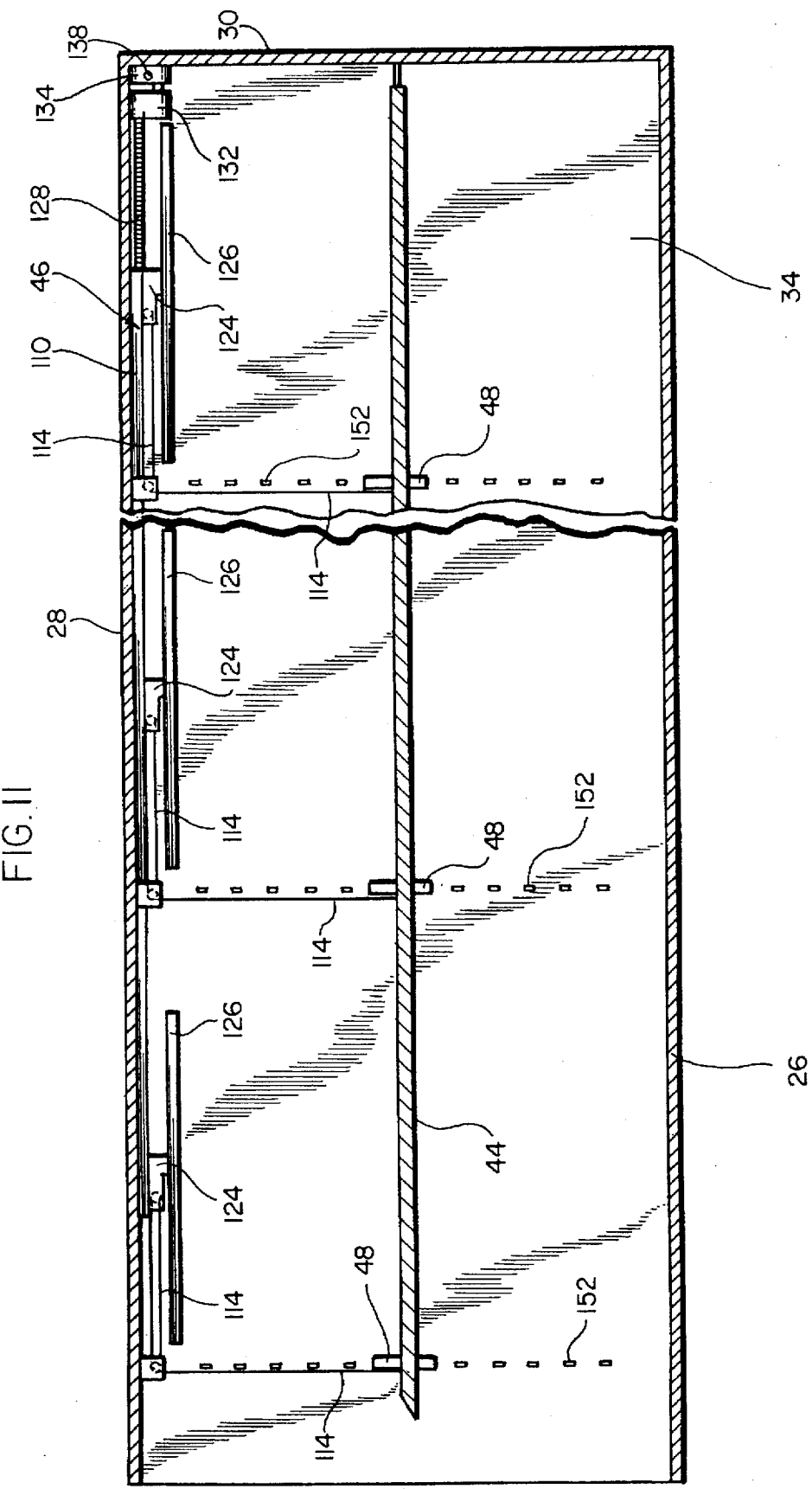

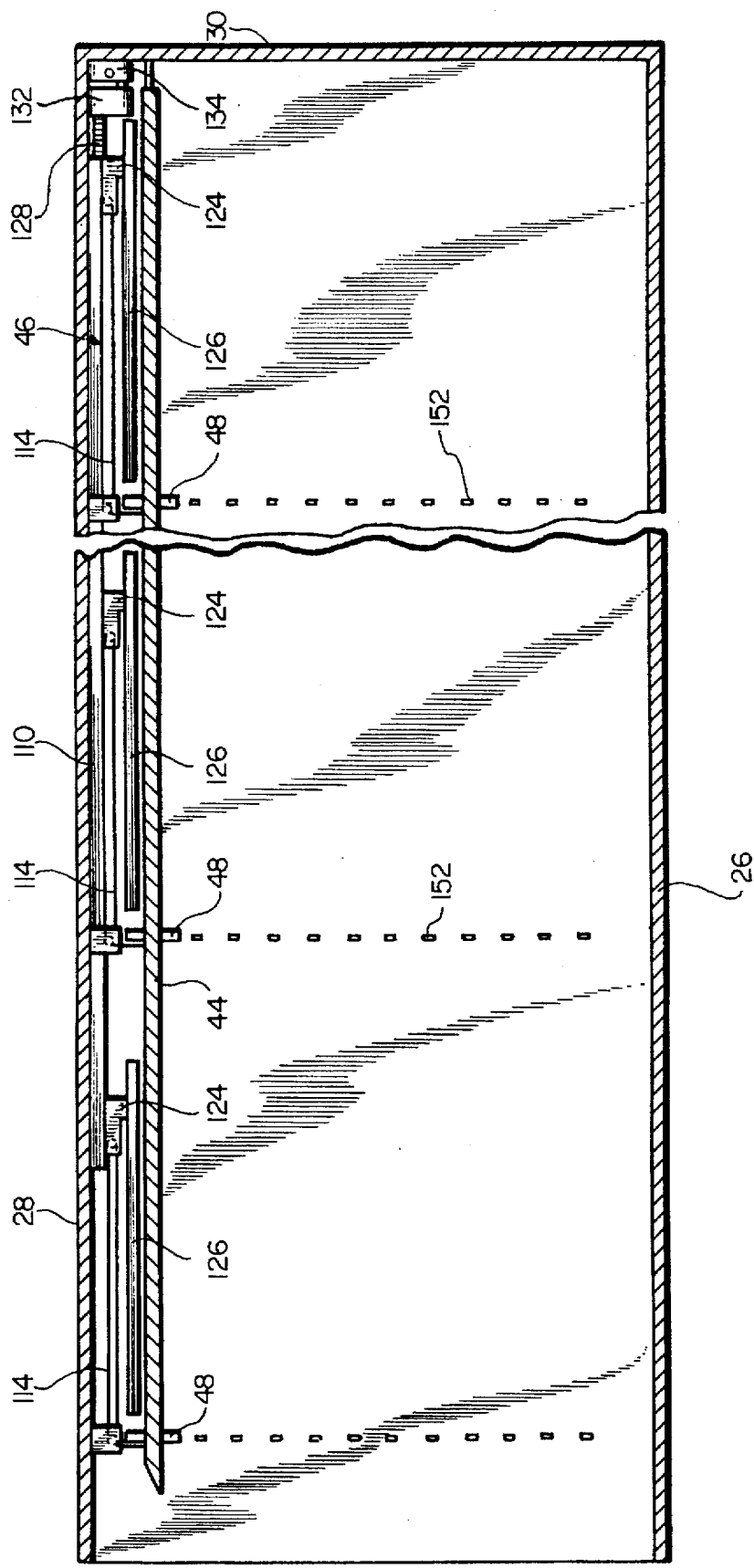

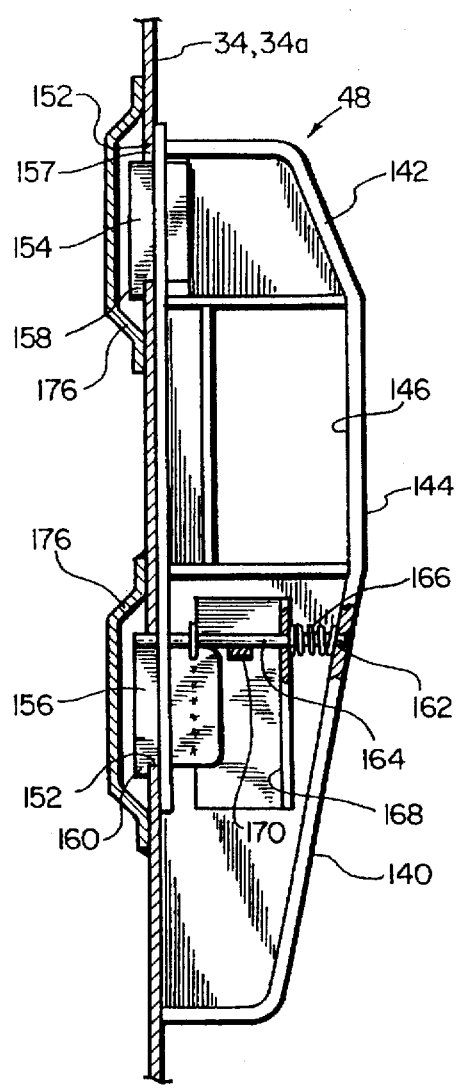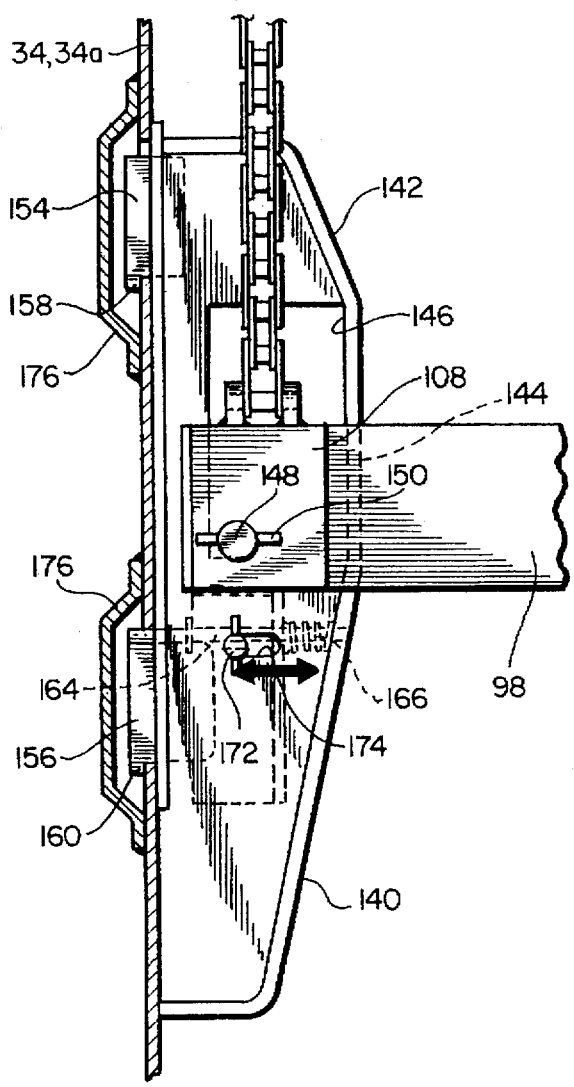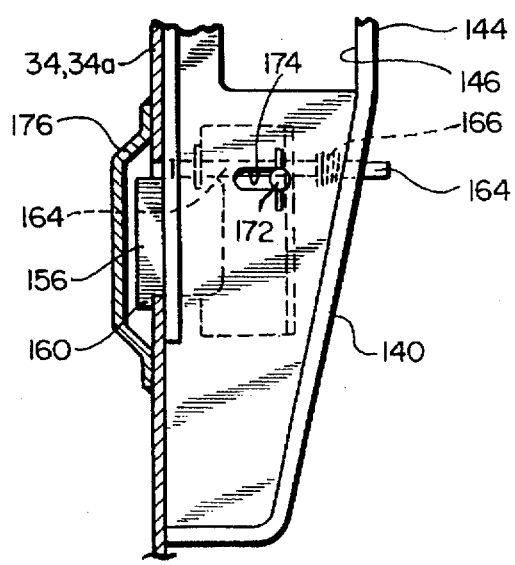

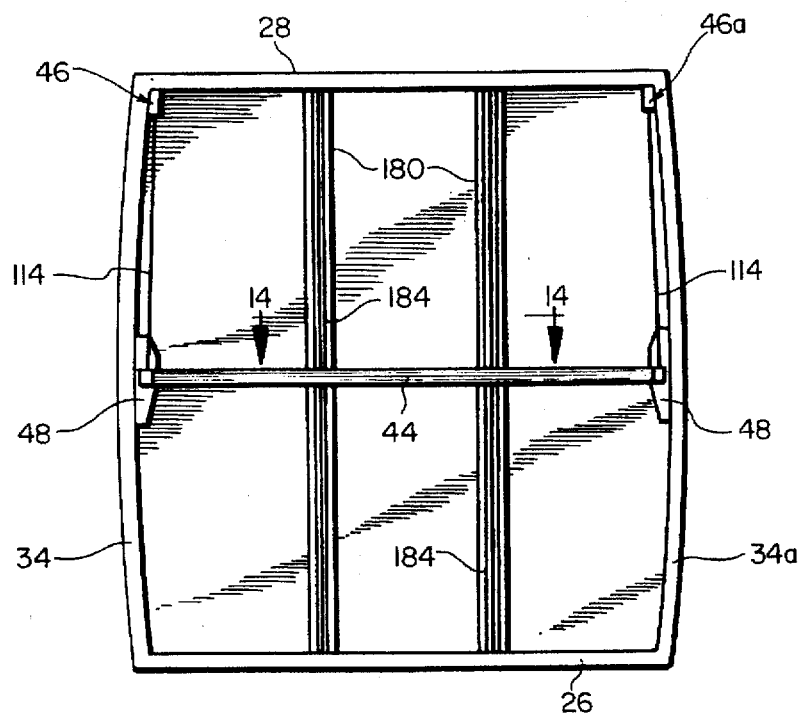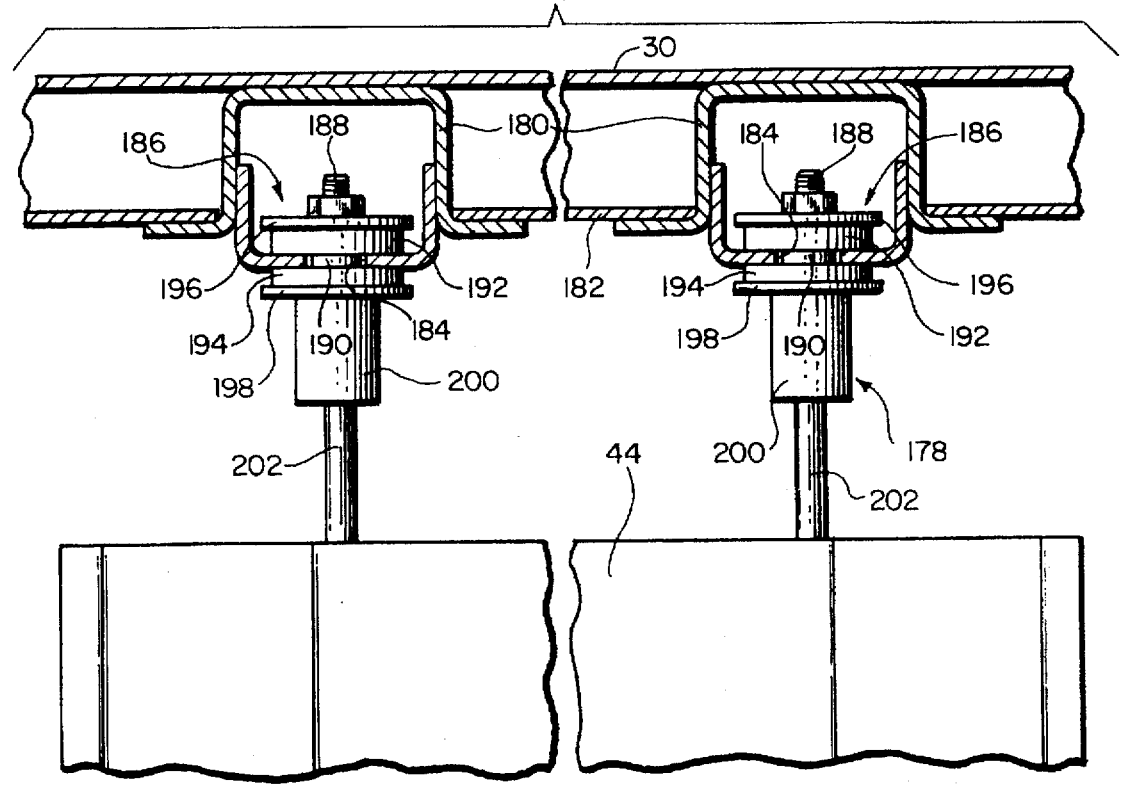

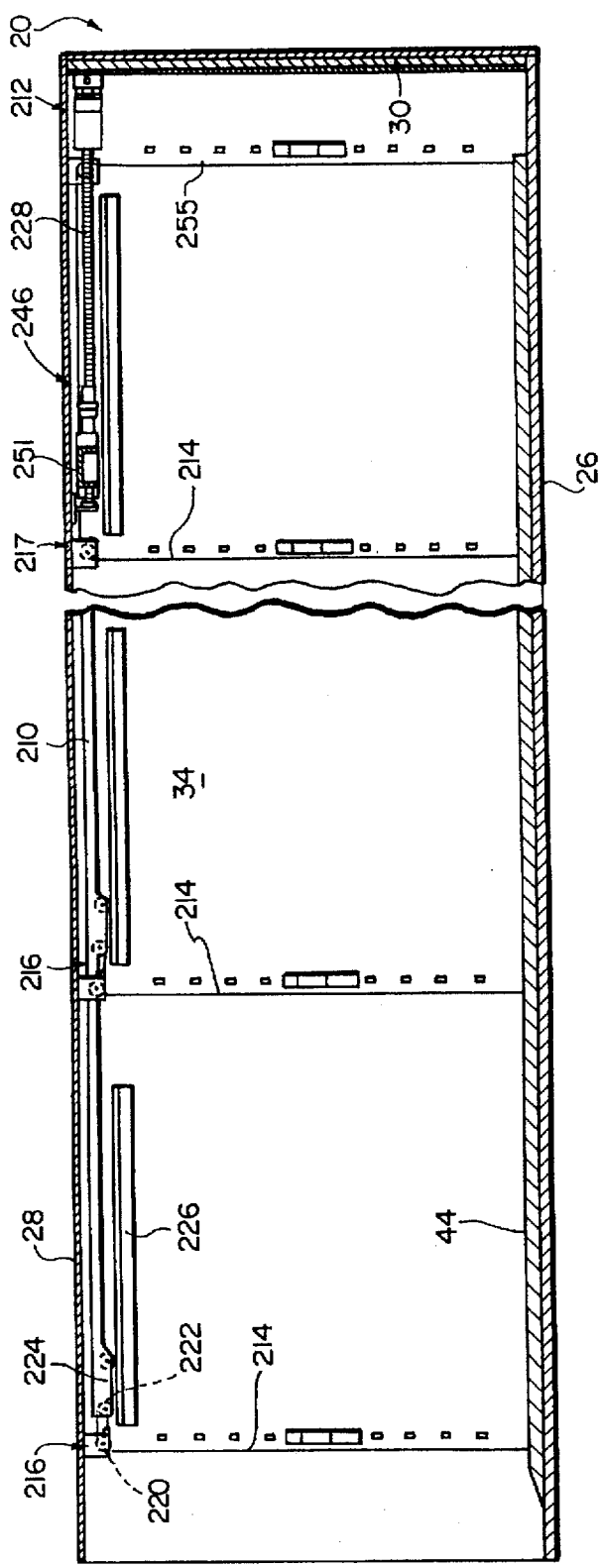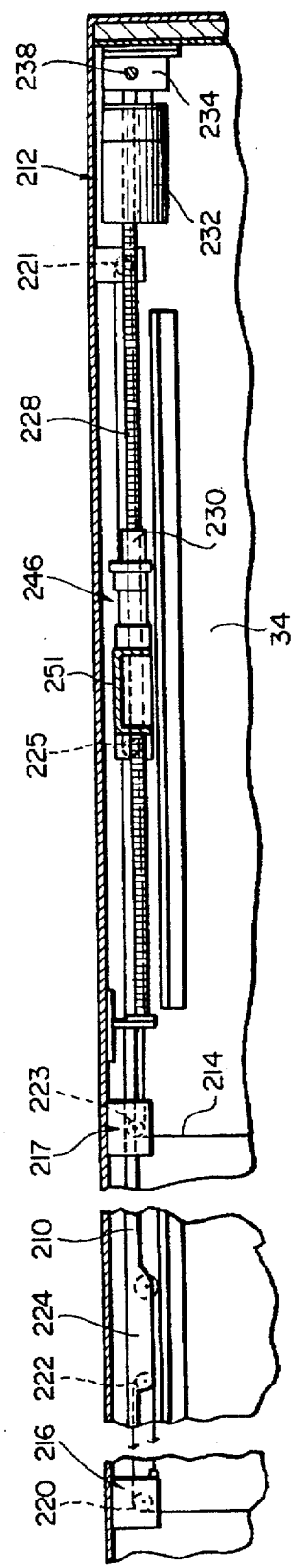

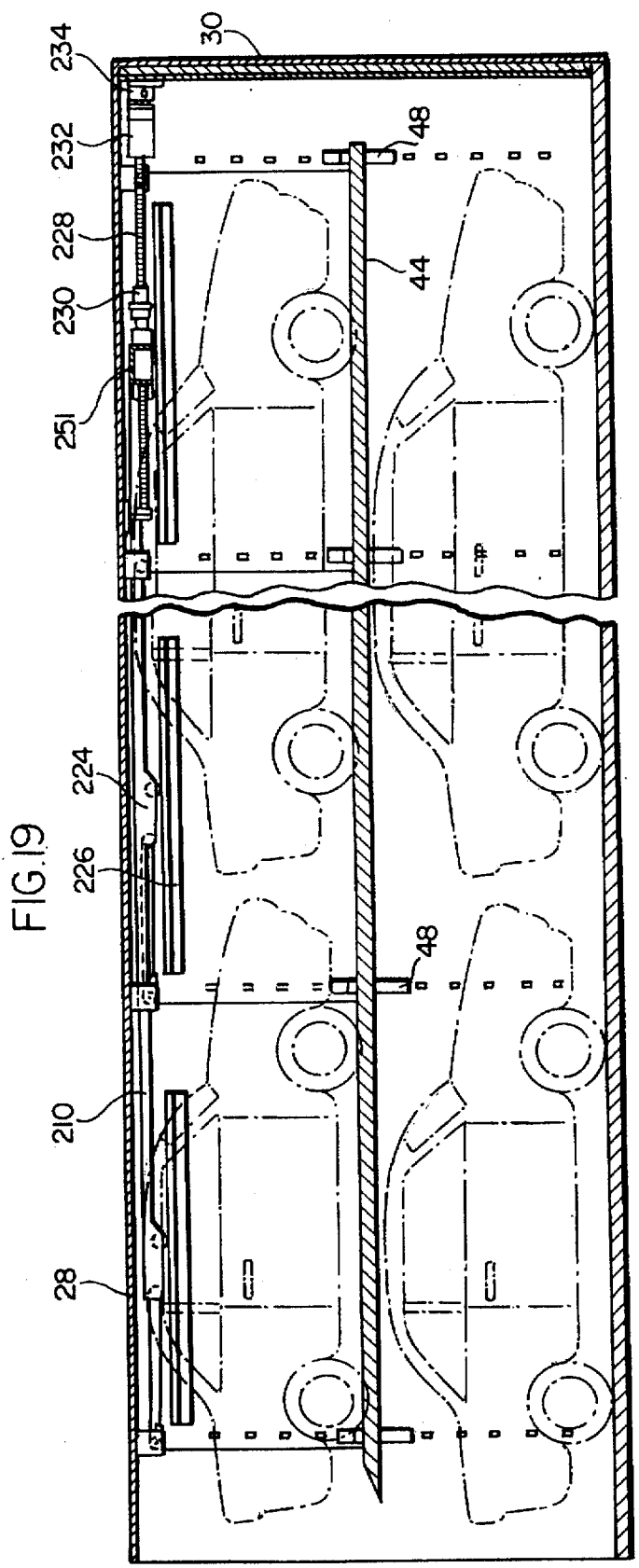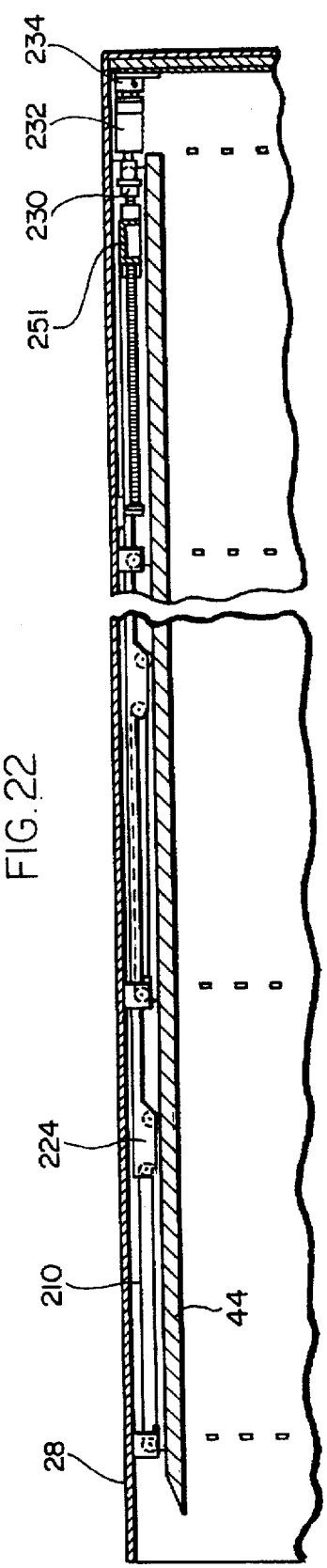

LIFTING MECHANISM FOR A DECK SYSTEM

This application is a continuation-in-part of U.S. patent application Ser. No. 08/389,205 filed Feb. 15, 1995 entitled "AUTO HAULING VAN".

BACKGROUND OF THE INVENTION

This invention is generally directed to a novel van-type trailer for hauling general freight, automobiles, small trucks and the like over the road or by rail. More particularly, the invention contemplates a van-type trailer which can be efficiently adapted to carry a variety of cargo, such as automobiles, general freight and the like for transporting the same.

In a conventional shipping procedure, when automobiles or the like are manufactured at a manufacturing plant, the automobiles must be loaded onto a trailer to transport the automobiles over the road. If the automobiles are to be shipped a great distance, to minimize costs, the automobiles are usually shipped by rail. To reach the final destination, such as the dealer's place of business, the automobiles are offloaded from the rail car and reloaded onto a trailer which drives the automobiles to the final destination.

The trailers which are designed to transport and carry automobiles are usually an open truss configuration which is specifically designed to carry automobiles. Often, automobiles are shipped from one side of the country to the other side of the country, for example from Detroit, Mich. to Los Angeles, Calif. Once the automobiles are offloaded in California, the manufacturer usually desires to transport a load of cargo back across the country to efficiently use the trailer. Since the trailer is specifically designed to transport automobiles, only automobiles can be transported back to Detroit and other types of goods, such as general freight cannot be transported on the trailer. With this type of trailer, the trailer is often driven back across the country empty, therefore wasting gasoline and operator time.

This shipping procedure can cause delays and possible damage to the automobiles due to the repeated loading and unloading of the automobiles onto trailers and rail cars. The procedure is also labor intensive which increases the costs of transporting the automobiles. Additionally, the open truss configuration exposes the automobiles to the outside elements and possible damage by debris on the roads.

The novel van-type trailer of the present invention is intended to prevent or minimize these problems, as well as to present several improvements and advantages over prior art trailers.

OBJECTS AND SUMMARY OF THE INVENTION

A general object of the present invention is to provide a novel van-type trailer which efficiently transports general freight, automobiles, trucks or the like.

An object of the present invention is to provide a trailer which reduces costs of transporting cargo.

Another object of the present invention is to provide a novel trailer structure and method for loading and unloaded cargo in the trailer.

Briefly, and in accordance with the foregoing, the present invention discloses a novel van-type trailer for hauling or transporting cargo, such as general freight, automobiles, small trucks and the like. The trailer has a floor, a top, side walls extending between the floor and the top, a front wall and rear doors. Wheels are attached underneath the floor by a highway suspension system and a landing gear is attached underneath the floor forward of the trailer's center of gravity. A deck element is mounted inside the trailer and is capable of being raised or lowered within the trailer by a lifting assembly.

The deck element includes deck beams which are parallel to each other and a plurality of lifting beams which are parallel to each other and perpendicular to the deck beams. The deck beams and the lifting beams are secured to each other by suitable means. The deck element further includes a walkway along which an operator can walk to enter or exit the automobiles and the trailer. The walkway is parallel to the deck beams and is secured to the lifting beams.

A first embodiment of the lifting assembly includes two tension bar members which run along the top of each side wall of the trailer, two threaded screws, internally threaded nuts, a motor and connecting members, preferably chains, which connect the tension bars and the deck element together. The tension bar members and the screws are horizontally arranged along the top of the trailer. The screw is connected to the tension bar member and to the motor. The nut is attached between the tension bar member and the screw. The nut is affixed to and nonrotatable with respect to the tension bar member. The screw is rotatable with respect to the nut. The motor rotates the screw which, due to the thread engagement between the screw and the nut, causes the tension bar member to translate relative to the respective side wall of the trailer towards an end of the trailer which, in turn, causes the chains to retract and lift the deck element upwardly from the floor of the trailer. The lifting assembly is also used to lower the deck element by the motor rotating the screw in the opposite direction thus causing the tension bar member to translate towards the opposite end of the trailer.

A second embodiment of the lifting assembly includes two tension bar members which run along the top of each side wall of the trailer, two threaded screws, internally threaded nuts, a motor, a gathering beam connecting the threaded screws to the tension bars, and connecting members, preferably chains, which connect the tension bars and the deck element together. The tension bar members, the screws and the gathering beam are horizontally arranged along the top of the trailer. The screw is connected to the gathering beam and to the motor. The nut is attached between the gathering beam and the screw. The nut is affixed to and nonrotatable with respect to the gathering beam. The screw is rotatable with respect to the nut. The motor rotates the screw which, due to the thread engagement between the screw and the nut, causes the gathering beam to translate relative to the side wall of the trailer towards an end of the trailer which, in turn, causes the tension beams to translate and the chains to retract and lift the deck element upwardly from the floor of the trailer. The lifting assembly is also used to lower the deck element by the motor rotating the screw in the opposite direction thus causing the gathering beam and the connected tension bar to translate towards the opposite end of the trailer.

Initially, the deck element abuts and rests against the floor of the trailer and the weight of the deck element rests thereupon. When the deck element is raised by the lifting assembly, the lifting beams are secured to cam brackets on the side walls of the trailer to take all of the weight of the deck, or at least minimize the amount of weight, on the chains in the lifting assembly. Each bracket is removable and has a locking mechanism thereon which locks and secures the bracket to the side wall of the trailer to prevent the bracket from inadvertently detaching from the side wall.

To load the van-type trailer with cargo, the wheels of the trailer are locked against rotation by a conventional brake. The trailer is driven backwards to move the suspension system and wheels forwardly to approximately the midpoint of the trailer, but preferably behind the trailer's center of gravity.

Thereafter, the suspension system is disengaged to tilt the rear end of the trailer towards the ground around the suspension system. The suspension system may be a conventional suspension system which includes an air bag between the floor and the wheels of the trailer for permitting relative up-and-down movement between the trailer and the wheel axle. To disengage the suspension system, air is released from the air bag. The landing gear is lowered to the ground to further tilt the rear end of the trailer around the suspension system and towards the ground until the rear end of the trailer contacts the ground.

After the trailer has been tilted, ramps are placed between the inside of the trailer and the ground. Cargo is then loaded onto the deck element. Thereafter, the deck element is raised by the lifting assembly to a height sufficient to load cargo underneath the deck element and is secured to the side walls of the trailer via the cam brackets. Cargo is then loaded onto the floor of the trailer underneath the deck element. If desired, the cargo can be loaded in the trailer with the cargo on the deck element offset to one side of the trailer and cargo on the floor offset to the other side of the trailer from which the cargo on the deck element is loaded.

Since the tension bars, threaded screws and gathering beam which comprise elements of the first and/or second embodiment of the lifting mechanism are horizontally arranged along the top wall of the trailer, the interior space of the trailer above the deck element is substantially unobstructed. Therefore, an automobile that is loaded on the deck element in the trailer has sufficient room therein. When the automobile is loaded onto the deck element, the roof of the automobile sits between the tension bars and rearward of the gathering beam. Thus, the roof of the automobile is able to be very close to the top wall of the trailer, so that maximum cargo space is utilized in the trailer.

The deck element can be raised to be generally proximate to the top of the trailer without any cargo being loaded onto the deck element. If the deck element is raised to the top of the trailer, cargo is loaded onto the floor of the trailer. In this configuration, sufficient unobstructed room is provided within the interior of the trailer for general freight or the like. When the deck element is raised to be generally proximate to the top of the trailer, the deck element does not need to be secured to the side walls of the trailer by the cam brackets. The chains between the tension bar and the deck element are shortened to a sufficiently short length such that the deck element is substantially unable to move relative to the lifting mechanism.

In addition, when the deck element is raised to be generally proximate to the top of the trailer, the ramps and the cam brackets can be stored on top of the deck element between the deck element and the top of the trailer. This allows the ramps and the brackets to always be shipped in the trailer so that they do not get lost, and in addition, allows the ramps and the brackets to be available for use whenever the deck element is to be used for carrying cargo.

The cargo in the trailer can be unloaded using the same tilting procedure as for loading cargo onto the trailer.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a side elevational view of a van-type trailer and a tractor connected thereto which incorporates features of the invention with the wheels of the trailer in a first position in which the trailer can be driven over the roads;

FIG. 1A is a partially fragmented, side elevational view of a plurality of van-type trailers in accordance with in FIG. 1 mounted on rail bogeys on which the trailers can be transported over the rail;

FIG. 2 is a side elevational view of the van-type trailer and tractor shown in FIG. 1 with the wheels of the trailer in a second position;

FIG. 2A is a side elevational view of a suspension system for the wheels of the van-type trailer with the suspension system in an inflated configuration when the wheels of the trailer are in the positions shown in FIGS. 1 and 2;

FIG. 4 is a side elevational view of the van-type trailer and tractor shown in FIG. 1 with the landing gear extended to the ground, the tractor disconnected from the kingpint and the back bumper guard on the rear end of the trailer contacting the ground;

FIG. 5 is a cross-sectional view of the van-type trailer which shows the loading sequence for a first set of automobiles, which are shown in top plan view, to be loaded into the trailer, and onto the deck element;

FIG. 6 is a cross-sectional view of the van-type trailer which shows the loading sequence for a second set of automobiles, two of which are shown in phantom outline and one of which is shown in top plan view, to be loaded into the floor of the trailer after the deck element is raised, with the first set of automobiles shown in FIG. 5 in top plan view;

FIG. 7 is a cross-sectional view of the van-type trailer showing a top plan view of deck assembly which incorporates features of the invention within the trailer;

FIG. 8 is cross-sectional view of the deck assembly along line 8—8 in FIG. 7;

FIG. 9 is cross-sectional view of the deck assembly along line 9—9 in FIG. 7;

FIG. 11 is a cross-sectional view of the van-type trailer showing the deck element and the first embodiment of the lifting assembly similar to FIG. 10 with the deck element in a raised position;

FIG. 12 is a cross-sectional view of the van-type trailer showing the deck element and the first embodiment of the lifting assembly similar to FIG. 10 with the deck element in an alternate raised position;

FIG. 13 is a side elevational view of a cam bracket which incorporates features of the present invention with the

Figure 20:
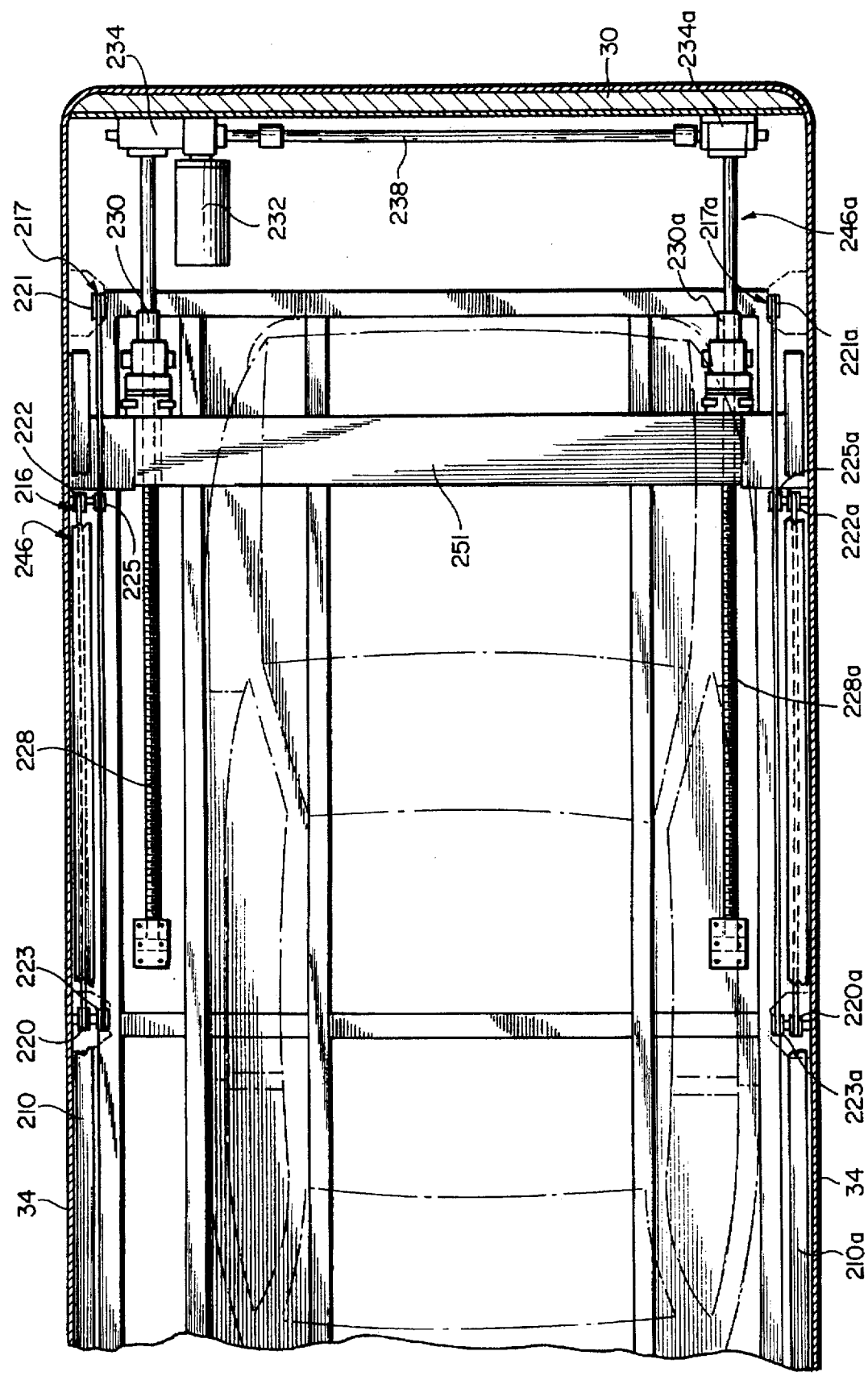
Figure 21:
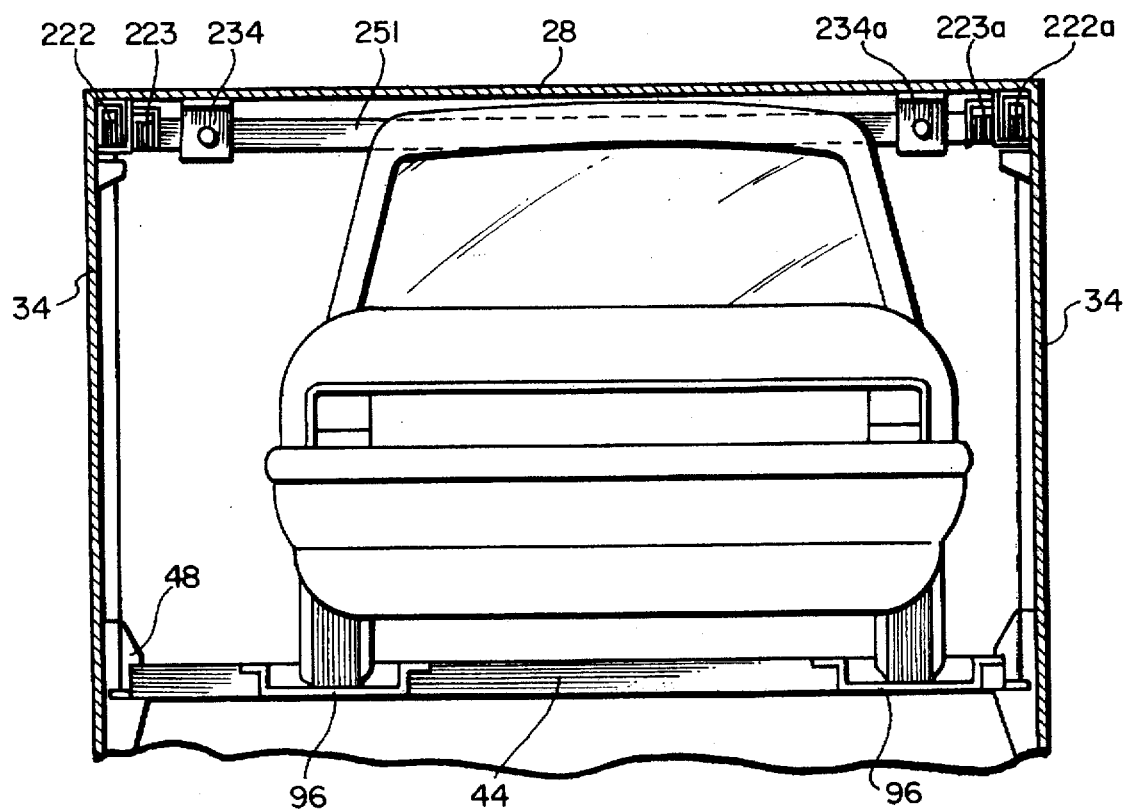
Figure 23:
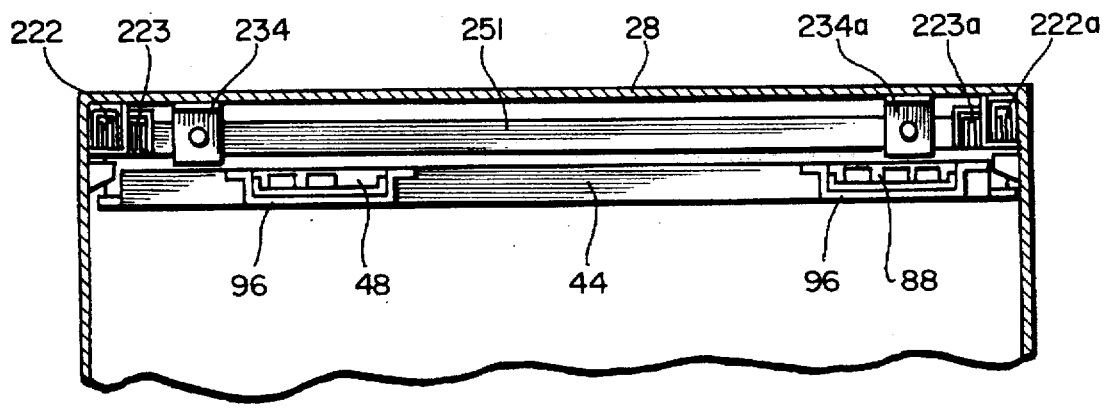
Figure 24:
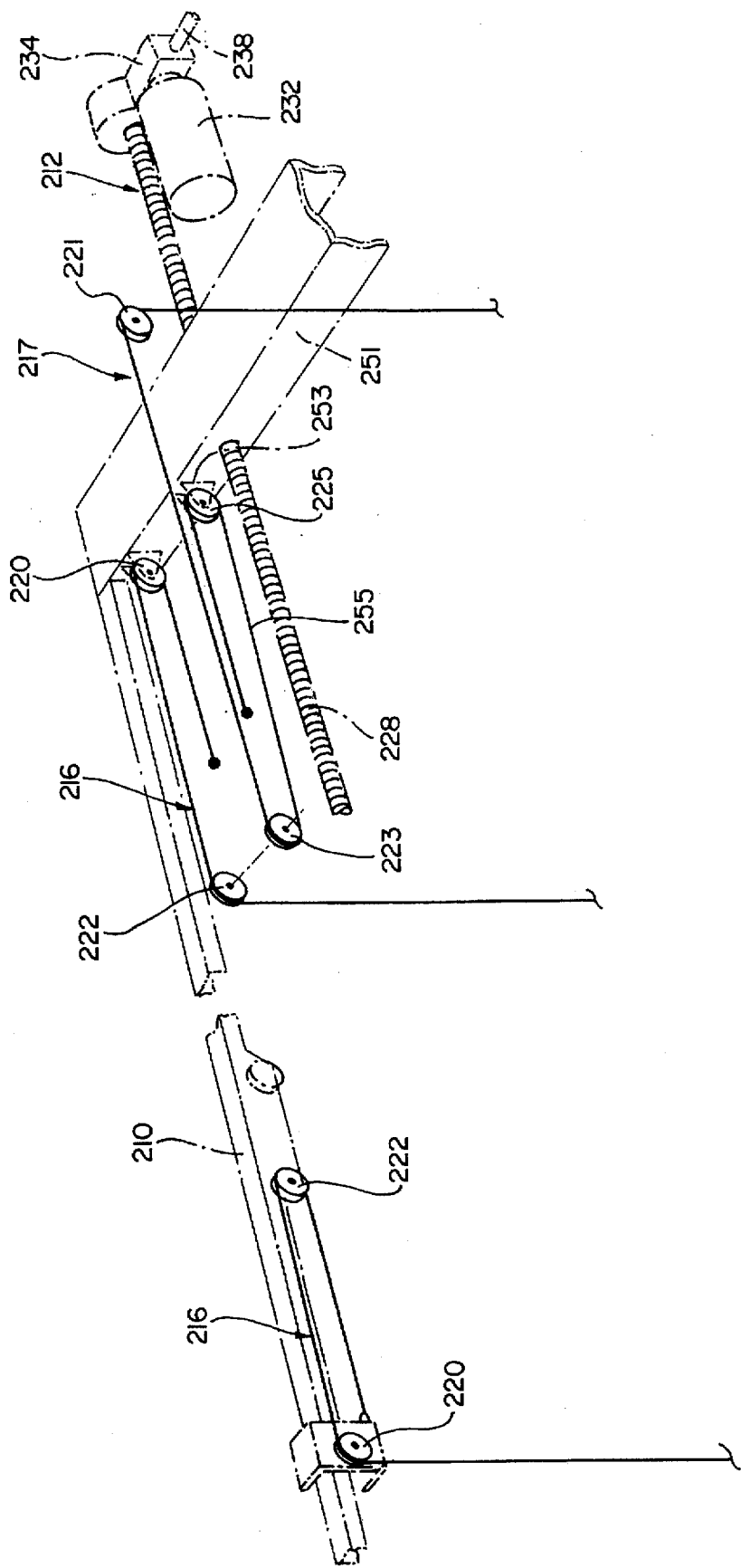

5 bracket being locked to the trailer side wall, which is shown in cross-section, for securing the deck to the trailer side walls;

FIG. 14 is a side elevational view of a cam bracket similar to the one shown in FIG. 13 with the deck element secured thereto;

FIG. 15 is a fragmentary, side elevational view of the bracket shown in FIG. 14 in an unlocked position;

FIG. 16 is a schematic, rear elevational view of the van-type trailer with the deck element raised to approximately the midpoint of the trailer;

FIG. 17 is a fragmentary, partially cross-sectional view of a fore and aft assembly for preventing forward-and-backward movement of the deck element when the deck element is being raised;

FIG. 18 is a is a cross-sectional view of the van-type trailer showing the deck element and a second embodiment of the lifting assembly with the deck element in a lowered position;

FIG. 18A is an enlarged, side elevational view of the second embodiment of the lifting assembly and a driving mechanism for the lifting assembly which incorporates features of the invention for raising or lowering the deck element;

FIG. 19 is a cross-sectional view of the trailer with the deck element in a raised position, with automobiles shown in phantom line loaded onto the floor and the deck element within the trailer;

FIG. 20 is a top plan view of the trailer showing the details of the second embodiment of the lifting assembly with an automobile shown in phantom lines loaded onto the deck element;

FIG. 21 is a partial, rear elevational view of trailer, showing an automobile loaded onto the deck element;

FIG. 22 is an enlarged, side elevational view of the second embodiment of the lifting assembly with the deck element raised to be adjacent to the top wall of the trailer;

FIG. 23 is a partial, rear elevational view of trailer, showing the deck element in a raised position which is proximate to the top wall of the trailer, with ramps and brackets seated on top of the deck element; and FIG. 24 is a schematic view of the second embodiment of the lifting assembly which has been exploded apart to show the details of the second embodiment of the lifting assembly.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

In FIG. 1, a novel van-type trailer 20 which incorporates features of the present invention is shown. The trailer 20 of the present invention is used to transport cargo, such as general freight, automobiles, small trucks and the like, over roads, highways and the like or by rail.

The trailer 20 of the present invention can be connected to a conventional tractor 24 by known means, such as a fifth wheel. The trailer 20 has a floor 26, a top 28, a front wall 30, a rear wall 32 and vertical side walls 34, 34a which extend between the floor 26 and the top 28 to form an elongated structure. The rear wall 32 has doors 36, shown schematically in FIGS. 5 and 6, to provide access into the interior of the trailer 20 so that cargo can be loaded into the trailer 20. A rear bumper guard 38 extends downwardly from the rearmost end of the trailer 20.

The side walls 34, 34a of the trailer 20 may be of various known constructions, but preferably a plate trailer construction such the one as disclosed in U.S. Pat. Nos. 4,685,721 and 4,810,027 are to be used. The structure of such plate trailer walls formed of aluminum plate is well-known and is not described herein.

The side walls 34, 34a of the trailer 20 may have forward cutouts 40 which are approximately at the midpoint of the trailer 20 proximate to but preferably, slightly rearward of the trailer's longitudinal center of gravity. The trailer 20 may have rearward cutouts 42 which are proximate to the rear end of the trailer 20. Multiple rear cutouts may be provided.

The top 28 of the trailer 20 of the present invention is spaced further from the floor 26 than tops in conventional plate trailers for reasons described herein. In the trailer 20 of the present invention, the top 28 is preferably 118 inches or more from the floor 26.

A deck element 44, which is described in detail herein with respect to FIGS. 7–9, is positioned inside the trailer 20. The deck element 44 has a length and a width which is preferably slightly smaller than the interior length and width of the trailer 20. The deck element 44 can rest horizontally on the floor 26 of the trailer 20 or the deck element 44 can be raised or lowered to a variety of horizontal positions relative to the vertical side walls 34, 34a of the trailer 20 by a lifting assembly, which is described in detail herein. The deck element 44 can be raised by the lifting assembly so as to be positioned proximate to the top 28 of the trailer 20. When the deck element 44 is in a raised position, the deck element 44 is secured to the side walls 34, 34a of the trailer 20 by cam bracket members 48, each of which are described in detail herein with respect to FIGS. 13–15. When the deck element 44 is raised to be adjacent to the top 28 of the trailer 20, the deck element 44 is preferably not secured to the side walls 34, 34a of the trailer 20, as described herein.

Figure 3:
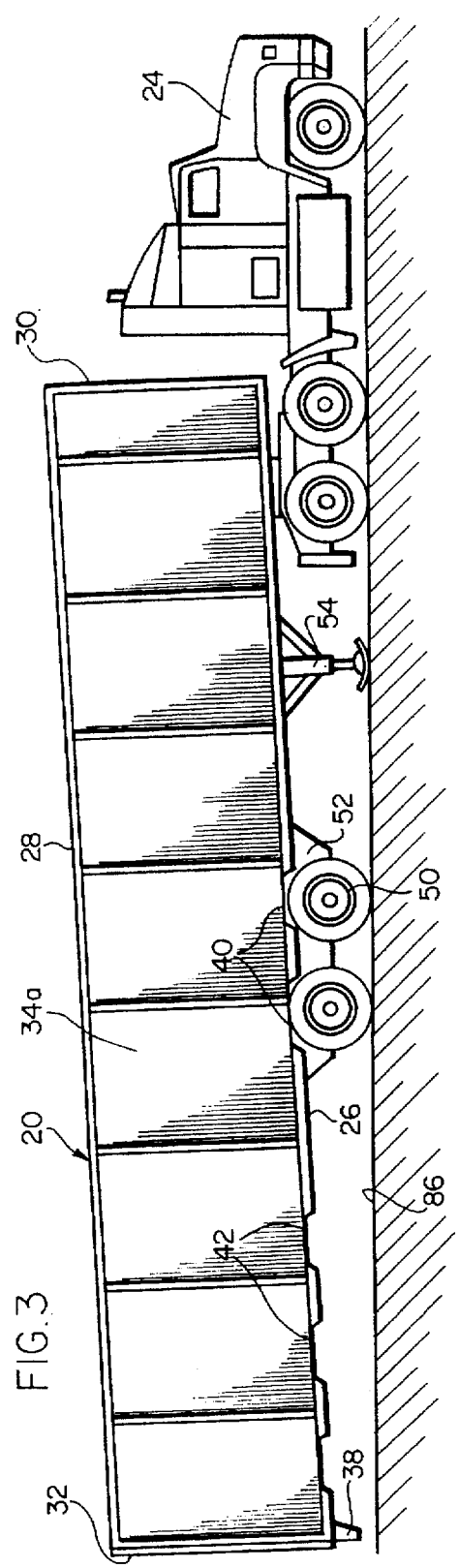
FIG. 3 is a side elevational view of the van-type trailer and tractor shown in FIG. 1 with the back end of the trailer tilted towards the ground.
Figure 3A:
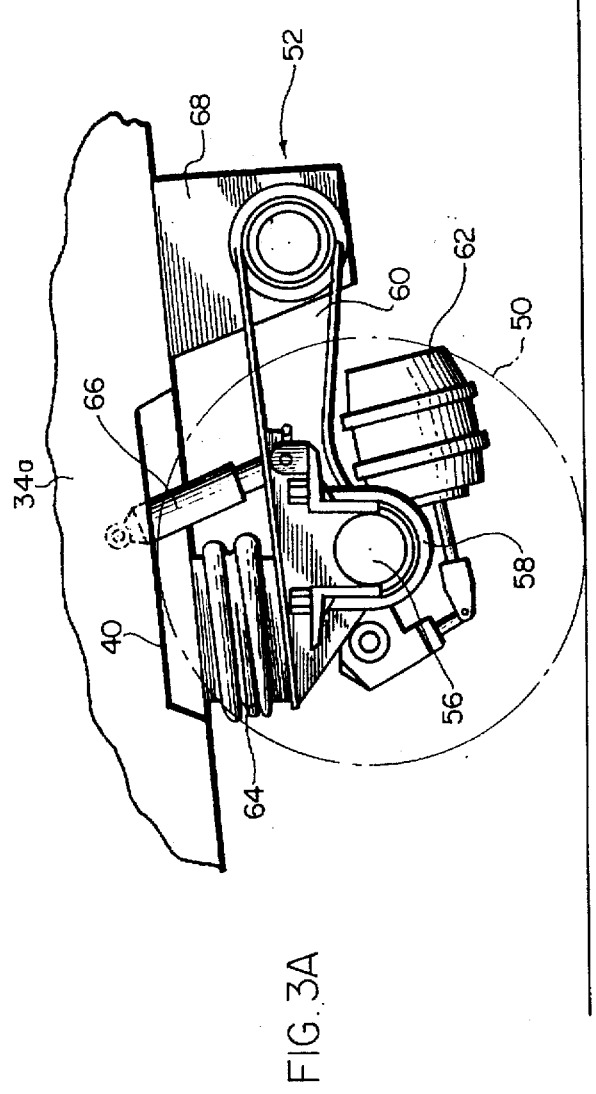
FIG. 3A is a side elevational view of the suspension system shown in FIG. 2A with the suspension system in a disengaged configuration when the rear end of the trailer is tilted towards the ground as shown in FIG. 3.

Conventional roadworthy wheels or tires 50 are attached to the underside of the floor 26 by a suitable highway suspension system 52 as described herein with respect to FIGS. 2A and 3A. A landing gear device 54 is attached to the underside of the floor 26 and is positioned approximately half way between the front end of the trailer 20 and the trailer's longitudinal center of gravity. The landing gear device 54 can be extended or retracted. During transit over the roads, the tires 50 are positioned underneath the rear cutouts 42 in the trailer 20 and the landing gear device 54 is in a retracted position as shown in FIG. 1.

A suitable, known slide frame assembly (not shown) is attached between the floor 26 and the suspension system 52. The slide frame extends from generally the rear end of the trailer 20 to the longitudinal center of gravity of the trailer 20. The slide frame assembly allows the wheels 50 and its associated highway suspension system 52 to move relative to the floor 26 for reasons described herein. Such a slide frame assembly may include a slide rail and slide pads attached between the suspension system 52 and the underside of the trailer 20. The slide frame assembly can be locked to prevent relative movement between the elements or unlocked to allow relative movement between the elements.

The suspension system 52, as shown in FIGS. 2A and 3A, includes a wheel axle 56 for carrying the tires 50 and which is supported in a U-shaped channel 58. The U-shaped channel 58 is supported by suitable means, for example bolts, at generally the end of a cantilevered lever or arm 60. The opposite end of the cantilevered arm 60 is rotatable about a fixed pivot, such as a bolt or a pin, which is attached to the slide frame assembly. Other conventional suspensions may also be used to support the wheel axle 56. A brake 62 of known structure is supplied on each wheel axle to prevent rotation of the tire 50 relative to the axle 56 upon application of the brake 62.

An air bag 64 of conventional structure is located between the slide frame assembly, and thus the floor 26 of the trailer 20, and the wheel axle 56 to permit a spring action so that relative up-and-down movement is permitted between the axle 56 and the floor 26 during transportation of the trailer 20. The air bag 64 is attached to the trailer 20 by known, suitable means. The air bag 64 is made of a flexible material which can expand or compress. A tank of compressed air (not shown) is provided on the trailer 20 and a valve (not shown) is connected between the tank and the air bag 64 so as to adjust the pressure in the air bag 64 for supporting the weight of the trailer 20. While an air bag suspension is shown, it is to be understood that other suspensions of known construction, such as a spring suspension, can be used.

A vehicle shock absorber 66 for damping out the relative up-and-down movement between the trailer 20 and the wheel axle 56 permitted by the air bag 64 has a first end connected by a pivot, such as a pin or bolt, to a plate 68 which is affixed to the slide frame assembly. The second end of the shock absorber 66 is connected to the wheel axle 56 and the cantilevered arm 60 at a pivot, such as a pin.

As shown in FIG. 1, the trailer 20 is attached to a tractor 24. When the trailer 20 is attached to the tractor 24, the trailer 20 can be driven over roads, highways 70 and the like to transport the cargo. The trailer 20 may be attached to the tractor 24 by a kingpin assembly.

Alternatively, as shown in FIG. 1A, the trailer 20 can be attached to known rail bogeys 72 by a suitable mechanism 73, such as a transverse pin system at the rear end of the trailer, and driven over the rail 74. An example of such a rail bogey is disclosed in U.S. Pat. No. 5,040,466. The trailer 20 is releasable from the mechanism 73 so that the trailer 20 can be driven over the roads. The front of the trailer 20 is supported by a rail bogey 72 under the trailer in front of it. The arrangement presents a single articulated rail car. Alternatively, it is envisioned that a single bogey 72 can be shared between two trailers.

The trailers are attached to each other by a suitable coupling mechanism 78, such as a conventional no slack coupling, to form a van train. No slack couplings are well-known and are not described in detail herein. Briefly, the front end of the trailer 20 has a front tongue 80 which protrudes outwardly therefrom. The rear end of the trailer 20 has a slot or socket 82 therein which is complementarily shaped to the tongue 80. The tongue 80 on the front end of the trailer 20 locks into a slot 82 on the preceding trailer 20. A tongue 80 on the front end of the following trailer locks into the slot 82 in the rear end of the trailer 20. Locking mechanisms for locking tongues in slots in a no slack coupling are well-known and are not described herein.

Now that the trailer structure has been generally described, the method for loading the trailer 20 with cargo is described. For purposes of simplicity, the loading procedure is described with respect to automobiles where indicated. It is to be understood that cargo other than automobiles can be transported in the trailer 20.

First, the wheels 50 of the trailer 20 are locked against rotation by application of the brakes 62 and the slide mechanism is unlocked. An operator drives the tractor 24 backwards, thus driving the attached trailer 20 backwards, which causes the suspension system 52 and locked wheels 50 to slide and translate forward relative to the floor 26 of the trailer 20 along the slide frame assembly.

As shown in FIG. 2, the trailer 20 is backed up until the suspension system 52 and the wheels 50 are positioned forwardly to approximately the midpoint of the trailer 20 but preferably not past the longitudinal center of gravity of the trailer 20. At this point, the suspension system 52 and the wheels 50 are positioned underneath the forward cutouts 40 on the trailer 20. When the wheels 50 are in this forward position, the rear end of the trailer 20 may tilt slightly towards the ground 86 around the suspension system 52. The trailer 20 does not completely tilt towards the ground 86 since the air bag 64 in the suspension system 52 is inflated, as shown in FIG. 2A, and maintains a predetermined spacing between the wheel axle 56 and the trailer 20.

Once the wheels 50 are positioned forwardly to approximately the midpoint of the trailer 20, as shown in FIG. 3 and 3A, the tractor 24 is disconnected from the trailer 20 and the slide frame assembly is locked. Thereafter, the air suspension 52 is disengaged and deflated which causes the trailer 20 to pivot around the suspension system 52. The air suspension 52 may be deflated until the forward cutouts 40 on the side walls 34, 34a of the trailer 20 generally contact and rub the tires 50 of the trailer 20. Specifically, as shown in FIG. 3A, the air in the air bag 64 is vented or released from the air bag 64 by suitable methods so that the trailer 20 collapses downwardly towards the cantilevered arm 60 and wheel axle 56 and pivots around the suspension system 52.

Thereafter, as shown in FIG. 4, the landing gear device 54 is extended and lowered to the ground 86. The landing gear 54 acts to tilt the trailer 20 around the fulcrum provided by the suspension system 52 and the wheels 50 the rest of the way to the ground 86 until the trailer 20 stabilizes and the rear bumper guard 38 of the trailer 20 contacts the ground 86 at which time the rear end of the trailer floor 26 is only a couple of feet above the ground 86. After the rear bumper guard 38 of the trailer 20 abuts against the ground 86, an operator places short ramps 88 between the ground 86 and the lowered deck element 44 within the trailer 20, as shown in FIG. 5.

Now, the loading sequence for loading automobiles into the trailer 20 will be described in reference to FIGS. 5 and 6. A first set of automobiles 90 is first loaded onto the lowered deck element 44 which is resting on the floor 26 of the trailer 20 in a lowered position. The deck element 44 is only shown schematically in FIGS. 5 and 6 and is described in greater detail herein in reference to FIGS. 7–9. The deck element 44 is thereafter raised by the lifting assembly to a raised position and a second set of automobiles 92 is loaded onto the floor 26 of the trailer 20 beneath the deck element 44.

As shown in FIG. 5, when the first set of automobiles 90 is loaded into the trailer 20 and onto the deck element 44, the ramps 88 are offset to one side of the trailer 20 and the automobiles 90 are driven into the trailer 20 hood-first with passenger door proximate to one side wall 34a. When the automobiles 90 are loaded, the automobiles 90 are offset to the same side of the trailer 20 as the ramps 88. Since the automobiles 20 are offset to one side of the trailer 20, sufficient room is provided within the trailer 20 for the operator to open his or her door and exit the automobile 90 and the trailer 20.

After the first set of automobiles 90 is completely loaded onto the deck element 44, the deck element 44 is raised to approximately the midpoint of the trailer 20, as shown in FIG. 11, by the lifting assembly, which is described herein, and secured to the side walls 34, 34a of the trailer 20 via the cam bracket members 48. As illustrated in FIG. 6, the ramps 88 are moved by the operator to be offset to the other side of the trailer 20 from where the ramps 88 were in FIG. 5. The lower set of automobiles 92 is then driven trunk-first into the trailer 20 onto the floor 26 of the trailer 20 with the passenger side door proximate to the other side wall 34. Again, since the automobiles 92 are offset to one side of the trailer 20, sufficient room is provided within the trailer 20 for the operator to open his or her door and exit the automobile 92 and the trailer 20.

While the above loading sequence of the automobiles 90, 92 is described with the first set of automobiles 90 being driven into the trailer 20 hood-first and the second set of automobiles 92 being driven into the trailer 20 trunk-first, it is to be understood that the first set of automobiles 90 can be driven into the trailer 20 trunk-first and the lower set of automobiles 92 can be driven into the trailer 20 hood-first if desired. The offsetting of the upper set of automobiles 90 to one side of the trailer 20 and the lower set of automobiles 92 to the other side of the trailer 20 aids in balancing the trailer 20 when the trailer 20 is transported by rail. It is also within the scope of the invention that the automobiles 90 could be loaded into the middle of a suitable deck element which one of ordinary skill in the art could provide.

After the cargo has been loaded onto the trailer 20, the ramps 88 are removed and the air suspension 52 is inflated which causes the trailer 20 to pivot around the suspension system 52 and raise the back end of the trailer 20. The slide frame assembly is unlocked and the tractor 24 is driven forward to move the trailer 20 forwardly relative to the wheels 50 until the wheels 50 are positioned at the rearward cutouts 42. Thereafter, the slide frame assembly is locked and the tractor-trailer is ready to be transported.

The deck element 44, as shown in FIGS. 7–9, includes a walkway 94, deck beams 96 and a plurality of lifting beams 98. The walkway 94, deck beams 96 and lifting beams 98 are made of suitable, lightweight, high strength, rigid materials, such as aluminum or steel. The deck beams 96 and the walkway 94 are parallel to each other and the deck beams 96 are offset to one side of the walkway 94. The lifting beams 98 are parallel to each other and are perpendicular to the deck beams 96 and the walkway 94. The walkway 94, deck beams 96 and the lifting beams 98 are secured together by suitable means, such as welding or bolting.

The deck beams 96 receive the wheels of the automobiles therein. The walkway 94 permits an operator access to and egress from the automobiles in the trailer 20.

As shown in FIG. 8, the deck beams 96 are generally U-shaped. The U-shape has a base channel or portion 100, upstanding side wall channels or portions 102 which extend upwardly from the base portion 100 and top channels or portions 104 which extend outwardly from the top of the side wall portions 102. The walkway 94 is flat and may be connected to one of the deck beams 96.

As illustrated in FIG. 9, the lifting beams 98 are square tubes and, as shown in FIG. 7, connect the U-shaped deck beams 96 together. The lifting beams 98 extend through apertures in the side wall portions 102 of the deck beams 96. The lifting beams 98 and the deck beams 96 are secured together by suitable means, such as by bolting or by welding. The top surface 106 of the lifting beam 98 is generally flush with the top portions 104 of the deck beams 96. Triangular ramps 105, which are provided on each side of the lifting beam 98, permits an automobile to be driven safely and smoothly over the lifting beam 98 without damage to the automobile's tires. The triangular ramps 105 are connected to the deck beam 96 by suitable means, such as welding or bolting.

To load the automobiles, each automobile is driven along the length of the deck beams 96 with the tires on one side of the automobile translating along one U-shaped channel and the tires on the other side of the automobile translating along the other U-shaped channel. The automobile is driven over the triangular ramps 105 and lifting beams 98 as it is driven along the length of the deck element 44. When the automobile is parked on the deck element 44 and secured by suitable, known means to the deck element 44, the tires of the automobile sit within the respective U-shaped channels of the deck beams 96. The ends 108 of the lifting beams 98 are connected to the lifting assembly as described hereinbelow.

This deck element 44 minimizes the weight in the trailer 20 since the deck element 44 is specifically designed to carry automobiles, trucks or the like and is not a solid sheet. While the deck element 44 described herein is configured especially for automobiles, trucks or the like, it is within the scope of the invention that a deck element 44 capable of accommodating a variety of cargo can be used in the trailer 20. For example, a solid sheet of metal could be used for the deck element.

Figure 10:
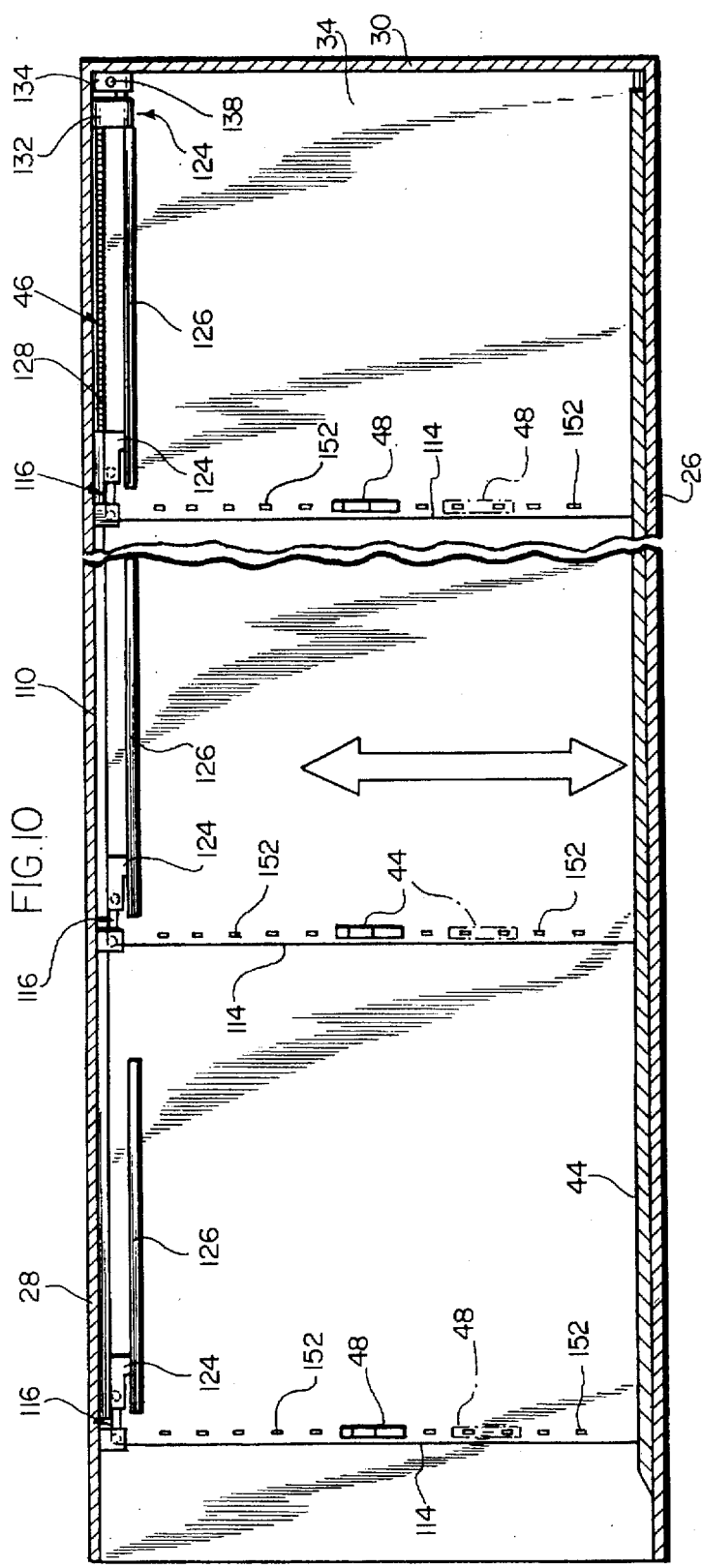
FIG. 10 is a cross-sectional view of the van-type trailer showing the deck element and a first embodiment of a lifting assembly, with the deck element in a lowered position.
Figure 10A:
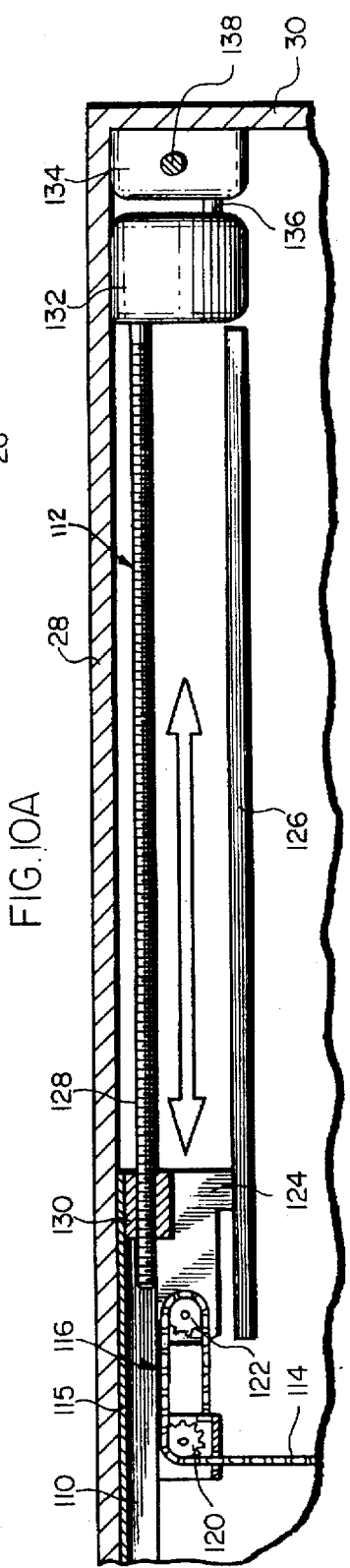
FIG. 10A is an enlarged, side elevational view of the first embodiment of the lifting assembly and a driving mechanism for the lifting assembly which incorporates features of the invention for raising or lowering the deck element.

A first embodiment of the lifting assembly 46, 46a is shown in FIGS. 7, 10, 11 and 12 and in detail in FIG. 10A. A second embodiment of the lifting assembly 246, 246a is shown in FIGS. 18–24 and in detail in FIG. 18A. The specifics of the first embodiment of the lifting assembly is set forth first and thereafter, the details of the second embodiment of the lifting assembly is set forth.

Directing attention to the first embodiment of the lifting assembly 46, 46a, as shown in FIGS. 7–12, a lifting assembly 46, 46a is provided on each side of the trailer 20 to lift the deck element 44. The lifting assembly is described with respect to the lifting assembly 46 on one side of the trailer 20. The lifting assembly 46a on the other side of the trailer 20 is identical to lifting assembly 46 except for the differences described herein.

The lifting assembly 46 generally includes a tension channel or bar 110 which extends along the length of the trailer 20 a predetermined distance, a driving assembly 112 to retract the tension bar 110 towards the front end of the trailer 20 and a plurality of elongated, flexible connecting elements 114, such as chains, operatively interengaged with the tension bar 110 and, thus the driving assembly 112, by pulley assemblies 116 and to the deck element 44. The tension bar 110 can be one elongated bar or can be a series of bars bolted together. A mounting flange (not shown) is attached to the inner surface of the side walls 34 for mounting the tension bar 110 thereto. The tension bar 110 slides relative to the mounting flange. An anti-friction pad 115 can be mounted between the top 28 of the trailer 20 and the top of the tension bar 110. The anti-friction pad allows the tension bar 110 to slide easily relative to the walls of the trailer 20. The tension bar 110 is horizontally arranged along the length of the trailer 20 and is proximate to and abuts against the top 28 of the trailer and the side wall 34 of the trailer 20 such that the tension bar 110 is mounted at the juncture of the side wall 34 and the top 28 of the trailer 20.

Directing attention to FIG. 10A, each pulley assembly 116 includes a first pulley 120 which is secured to an upper margin of the side wall 34 of the trailer 20 and a second pulley 122 which is secured to the tension bar 110 by a slide member 124. The first pulley 120 is rotatable with respect to the side wall 34 of the trailer 20. The second pulley 122 is rotatable with respect to the slide member 124.

Each chain 114 is interconnected between each pulley assembly 116 and the deck element 44. Each chain 114 is proximate to and spaced closely to the side wall 34 of the trailer 20. Specifically, in each pulley assembly 116, one end of the chain 114 is secured to the side wall 34 of the trailer 20 proximate to the first pulley 120 by suitable means. The chain 114 is looped around the second pulley 122 and then around the first pulley 120. The other end of the chain 114 is secured to the end 108 of the lifting beam 98 by suitable means. In the present invention, a chain 114 is preferably used instead of a cable since the chain 114 is pulled around pulleys 120, 122 and is subject to the relatively sharp bend of the small pulleys 120, 122 which a cable may not be able to withstand.

For each pulley assembly 116, a base rail 126 is provided along which the slide member 124 can slide. Each base rail 126 is mounted on the side wall 34 of the trailer 20 by suitable means at a predetermined distance downward from the tension bar 110 which is sufficient to provide space for the slide member 124. The bottom end of the slide member 124 contacts the base rail 126 and slides relative to the base rail 126 when the tension bar 110 is retracted by the driving assembly 112.

The driving assembly 112 includes a threaded screw member 128 connected to an internally threaded nut 130 at generally one end of the screw member 128 and to a DC motor 132 at the opposite end of the screw member 128. The nut 130 is affixed to the tension bar 110 and is fixed against rotation relative to the tension bar 110. The threaded screw member 128 extends a predetermined distance along the length of the trailer 20 and is connected to the tension bar 110 through the nut 130 by thread engagement with the nut 130. The screw member 128 and the motor 132 are horizontally arranged and are proximate to the side wall 34 and the top 28 of the trailer 20 such that the screw member 128 and the motor 132 are positioned at the juncture between the side wall 34 and the top 28 of the trailer 20. The screw member 128 is rotatable with respect to the nut 130.

A ninety degree gear box 134 is connected to the DC motor 132 by a horizontal shaft 136. A common shaft 138 is connected to the ninety degree gear box 134 at one end and to another ninety degree gear box 134a at its opposite end. The common shaft 138 is horizontal and runs adjacent to the front wall 30 and the top 28 of the trailer 20 such that it is positioned proximate to the juncture between the front wall 30 and the top 28. As shown in FIG. 7, in the lifting assembly 46a on the opposite side of the trailer 20, the DC motor 132 is eliminated. The screw member 128a is instead directly connected to the ninety degree gear box 134a which is connected to the common shaft 138. The lifting assembly 46a is driven by the DC motor 132 via the ninety degree gear boxes 134, 134a and the common shaft 138.

Initially, as shown in FIG. 10, the horizontal deck element 44 contacts and rests against the floor 26 of the trailer 20. In this position, the chains 114 are fully extended and extend generally from the floor 26 to the top 28 of the trailer 20.

To raise the deck element 44, the DC motor 132 rotates the screw member 128 on the one side of the trailer 20. The DC motor 132 is driven by suitable, known circuitry (not shown). By action of the ninety degree gear boxes 134 and the common shaft 138, the screw member 128a on the other side of the trailer 20 also rotates. The screw members 128, 128a rotate relative to the fixed nuts 130, 130a which causes the nuts 130, 130a and the affixed tension bars 110, 110a to translate along the length of the screw members 128, 128a due to the thread engagement between the nuts 130, 130a and the associated screw members 128, 128a. On each side of the trailer 20, the slide members 124 slide along the base rails 126 as the tension bars 110 translate which causes the distance between the pulleys 120, 122 to increase. This action causes the chains 114 on each side of the trailer 20 to advance around the respective first and second pulleys 120, 122. Since the end of each chain 114 is secured to the side wall 34, 34a of the trailer 20 proximate to the first pulley 120, the chain 114 is gathered at the top of the trailer 20 and the chain 114 is "doubled over" onto itself. That is, a length of chain is gathered between the fixed end (the end fixed on the side wall 34) of the chain 114 and the pulley 122 and another length of chain is gathered between the pulley 122 and the pulley 120. For every foot the tension bars 110, 110a translate, the deck element 44 is raised two feet. The deck element 44 is lowered in the same method. By rotating the screw members 128, 128a in the opposite direction by action of the DC motor 132, the thread engagement causes the tension bars 110, 110a to translate in the opposite direction to which they initially translated causing the distance between the pulleys 120, 122 to lessen.

Directing attention to the second embodiment of the lifting assembly 246, 246a, as shown in FIGS. 18–24, a lifting assembly 246, 246a is provided on each side of the trailer 20 to lift the deck element 44. The second embodiment of the lifting assembly 246, 246a is identical to that of the first embodiment, except where differences are noted. Like elements in the second embodiment of the lifting assembly 246, 246a to that of the first embodiment are denoted with like reference numerals, with such like elements in the second embodiment denoted by numerals in the two hundreds.

The lifting assembly is described with respect to the lifting assembly 246 on one side of the trailer 20. The lifting assembly 246a on the other side of the trailer 20 is identical to lifting assembly 246 except for the differences described herein.

The lifting assembly 246 generally includes a tension channel or bar 210 which extends along the length of the trailer 20 a predetermined distance, a gathering beam 251 which extends across the trailer 20 and perpendicular to the tension bar 210, a driving assembly 212, a plurality of elongated, flexible connecting elements 214, such as chains, and a single elongated, flexible connecting element 255, such as a chain. The chains 214 are operatively interengaged with the gathering beam 251 and the tension bar 210 and, thus the driving assembly 212, by pulley assemblies 216, and to the deck element 44. The driving assembly 212 retracts the gathering beam 251 and thus, the tension bar 210 towards the front end of the trailer 20 thereby taking up or shortening the connecting elements 214, 255 to raise the deck element 44.

The tension bar 210 is horizontally arranged along the length of the trailer 20 and is proximate to and abuts against the top 28 of the trailer and the side wall 34 of the trailer 20 such that the tension bar 210 is mounted at the juncture of the side wall 34 and the top 28 of the trailer 20. The gathering beam 251 is connected to the forward end of the tension bar member 210 by suitable means, such as welding or bolting and is horizontally arranged along the width of the trailer 20. The gathering beam 251 extends across the width of the trailer 20 to the tension bar on the opposite side of the trailer 20 and extends downwardly from the top 28 of the trailer 20 a predetermined distance.

Directing attention to FIGS. 18A and 24, each pulley assembly 216 rearward of the gathering beam 251 is similar in construction and operation to that of the pulley assembly 116 described in the first embodiment and is used to lift a rear portion of the deck element 44. Each assembly 216 includes a first pulley 220 which is secured to upper margin of the side wall 34 of the trailer 20 and a second pulley 222 which is secured to the tension bar 210 by a slide member 224. The slide member 224 may slide along or roll along by a roller on the base rail 226. The slide member 224 may be integrally formed with the tension bar 210 or separately therefrom and suitably joined together.

A second pulley assembly 217 is provided for lifting the front end of the deck element 44 and includes a first or idler pulley 221 which is secured to upper margin of the side wall 34 of the trailer 20 forward of the gathering beam 251, a second or idler pulley 223 which is secured to the upper margin of the side wall 34 of the trailer 20 rearward of the gathering beam 251, and a third pulley 225 which is secured to the gathering beam 251 by a connecting member 253. The first and second pulleys 221 and 223 are rotatable with respect to the side wall 34 of the trailer 20. The third pulley 225 is rotatable with respect to the connecting member 253 and thus, the gathering beam 251.

A chain 255 is interconnected between the pulley assembly 217 and the deck element 44. The chain 217 is proximate to and spaced a small distance from the forwardmost pulley assembly 216 and the side wall 34 of the trailer 20. One end of the chain 255 is secured to the side wall 34 of the trailer 20 proximate to the second pulley 223 by suitable means. The other end of the chain 255 is secured to the end 108 of the lifting beam 98 by suitable means. As shown most clearly in schematic form in FIG. 24, the chain 255 extends upwardly from the deck element 44 forward of the gathering beam 251, is looped up over the first pulley 221, through a suitable passageway in the gathering beam 251, around the second pulley 223, around the third pulley 225 to its fixed connection with the side wall 34 of the trailer 20. It is envisioned that the chain 255 could pass above the gathering beam 251 instead of through the beam 251. In the present invention, a chain 255 is preferably used instead of a cable since the chain 255 is pulled around pulleys 221, 223, 225 and is subject to the relatively sharp bend of the small pulleys 221, 223, 225 which a cable may not be able to withstand.

The driving assembly 212 includes a threaded screw member 228 connected to an internally threaded nut 230 and to a ninety degree gear box 234 at the forward end of the screw member 228. A DC motor 232 is connected to the gear box 234 by a shaft. The nut 230 is affixed to the gathering beam 251 and is fixed against rotation relative to the gathering beam 251. The threaded screw member 228 extends a predetermined distance along the length of the trailer 20 and is connected to the gathering beam 251 through the nut 230 by thread engagement with the nut 230. The screw member 228 and the motor 232 are horizontally arranged and are proximate to the top 28 of the trailer 20. The screw member 228 is rotatable with respect to the nut 230.

A common shaft 238 is connected to the ninety degree gear box 234 at one end and to another ninety degree gear box 234a at its opposite end. The common shaft 238 is horizontally arranged and runs adjacent to the front wall 30 and the top 28 of the trailer 20 such that it is positioned proximate to the juncture between the front wall 30 and the top 28. As shown in FIG. 20, in the lifting assembly 246a on the opposite side of the trailer 20, the DC motor 232 is eliminated. The screw member 228a is directly connected to the ninety degree gear box 234a which is connected to the common shaft 238. The lifting assembly 246, 246a is driven by the DC motor 232 via the ninety degree gear boxes 234, 234a and the common shaft 238.

Initially, the horizontal deck element 44 contacts and rests against the floor 26 of the trailer 20. In this position, the chains 214, 255 are fully extended and extend generally from the floor 26 to the top 28 of the trailer 20.

To raise the deck element 44, the DC motor 232 imparts rotation to the common shaft 238 which rotates the screw members 228, 228a via the gear boxes 234, 234a. The DC motor 232 is driven by suitable, known circuitry (not shown). The screw members 228, 228a rotate relative to the fixed nuts 230, 230a which causes the nuts 230, 230a and the affixed gathering beam 251 to translate along the length of the screw members 228, 228a due to the thread engagement between the nuts 230, 230a and the associated screw members 228, 228a. As the gathering bar 251 translates forwardly, the tension bars 210, 210a are pulled forwardly and translate along the length of the trailer 20.

On each side of the trailer 20, the slide members 224 slide along the base rails 226 as the tension bars 210, 210a translate which causes the distance between the pulleys 220, 222 in the pulley assemblies 216 to increase. This action causes the chains 214 on each side of the trailer 20 to advance around the respective first and second pulleys 220, 222. Since the end of each chain 214 is secured to the side wall 34, 34a of the trailer 20 proximate to the first pulley 220, the chain 214 is gathered at the top of the trailer 20 and the chain 214 is "doubled over" onto itself. That is, a length of chain is gathered between the fixed end (the end fixed on the side wall 34) of the chain 214 and the pulley 222 and another length of chain is gathered between the pulley 222 and the pulley 220. For every foot the tension bars 210, 210a translate, the deck element 44 is raised two feet.

Additionally, with respect to the forward pulley assembly 217 on each side of the trailer 20, the third pulley 225 translates forwardly in the trailer 20 with the gathering beam 251 since the pulley 225 is affixed thereto. This causes the distance between the second and third pulleys 223, 225 to increase and the distance between the first and third pulleys 2221 and 223 to decrease. This action causes the chains 255 on each side of the trailer 20 to advance over the first pulley 221, translate through the gathering beam 251, move around the second pulley 223 and then around the first pulley 225. Since the end of each chain 255 is secured to the side wall 34, 34a of the trailer 20 proximate to the second pulley 223, the chain 255 is gathered at the top of the trailer 20 and the chain 214 is doubled over onto itself. That is, a length of chain is gathered between the fixed end (the end fixed on the side wall 34) of the chain 255 and the third pulley 225 and another length of chain is gathered between the second pulley 223 and the first pulley 221. Thus, for every foot the gathering beam 251 translates, the deck element 44 is raised two feet.

The deck element 44 is lowered by rotating the screw members 228, 228a in the opposite direction, by action of the DC motor 232, and due to the thread engagement with the nut, causes the gathering beam 251 and thus, the tension bars 210, 210a, to translate in the opposite direction to which they initially translated causing the distance between the second and third pulleys 223, 225 to lessen and the distance between the first and third pulleys 221, 225 to increase and the distance between the first and second pulley 220, 222 to decrease and the length of the chains 214, 255 between the deck element 44 and the pulley 222, 225 to increase.

The deck element 44 can be raised to a variety of positions relative to the side walls 34, 34a of the trailer 20. As shown in FIG. 11, the deck element 44 is raised to the midpoint of the side walls 34, 34a. This allows two levels of automobiles 90, 92 or the like to loaded into the trailer 20, as shown in FIGS. 5 and 6, to maximize the interior cargo space within the trailer 20. As shown in FIG. 12, the deck element 44 is raised to be proximate to the top 28 of the trailer 20. The deck element 44 is shown spaced a distance from the top 28 in FIG. 12 for purposes of illustration. In practice, when the deck element 44 is raised to be proximate to the top 28 of the trailer 20, a minimal amount of space exists between the deck element 44 and the top 28. This allows general freight (not shown) to be loaded into the unobstructed interior space in the trailer 20 since the deck element 44 raised upward and out of the way.

When the deck element 44 rests on the floor 26 of the trailer 20, the weight of the deck element 44 is on the floor 26. When the deck element 44 is in a raised position, the weight on the chains 114 is removed, or at least minimized, by locking the deck element 44 to the side walls 34, 34a of the trailer 20. To lock the deck element 44 to the side walls 34, 34a of the trailer 20, the ends 108 of the lifting beams 98 are attached to the cam bracket members 48 which are secured to the side walls 34, 34a of the trailer 20, as described hereinbelow. The cam brackets 48 can be moved to a variety of positions relative to the side walls 34, 34a of the trailer 20.

As shown in FIG. 19, when the deck element 44 is raised to the midpoint of the trailer 20, a set of automobiles can be loaded onto the deck element 44 and a set of automobiles can be loaded onto the floor underneath the deck element 44, as described herein. The horizontal arrangement of the novel lifting mechanism described herein allows an automobile to be loaded into the trailer 20 without interfering with the space necessary for the automobiles while maximizing the amount of space provided for the automobiles.

If the first embodiment of the lift mechanism 46, 46a is used, since the tension bars 110, threaded screw members 128, DC motor 132 and common shaft 138 are positioned along the top of the trailer 20 and are horizontally arranged generally at the juncture between the top 28 and the side walls 34, 34a or the top 28 and the front wall 30, when the deck element 44 is lifted, the roofs of the automobiles are positioned a small distance away from the top of the trailer 20. The roof of the automobile sits between the tension bars 110 and associated pulley assemblies 116 such that the tension bars 110 and pulley assemblies 116 do not enter into the space which the automobile occupies.

Similarly, if the second embodiment of the lifting assembly 246, 246a is used, the tension bars 210, threaded screw members 228, DC motor 232 and common shaft 238 are horizontally positioned along the top of the trailer 20 and are arranged generally at the juncture between the top 28 and the side walls 34, 34a or the top 28 and the front wall 30 and do not enter into the space occupied by the automobiles when the deck element 44 is lifted. In addition, gathering beam 251 moves forward towards the front of the trailer 20, as described herein, to such an extent that the roof of the forwardmost automobile is positioned behind the gathering beam 251 such that the gathering beam 251 does not enter into the space necessary for the automobiles within the trailer 20. This allows the roof of the automobile to be positioned a small distance away from the top of the trailer 20. The roof of the automobile sits between the tension bars 110 and associated pulley assemblies 116 and the roof of the forwardmost automobile sits behind the gathering beam 251.

As shown in FIG. 12, when the deck element 44 is raised to be proximate to the top 28 of the trailer 20, general freight can be loaded onto the floor 26 of the trailer 20. The trailer 20 is expanded up higher than a conventional van-type trailer to provide for enough space for the deck element 44 to be proximate to the top 28 of the trailer 20 while leaving sufficient unobstructed room in the trailer 20 to load general freight. Since the floor 26 to top 28 height of the trailer 20 is 118 inches or more, the deck element 44 is completely out of the way and an unobstructed cargo space is provided for general freight or the like to be loaded into the trailer 20.

When the deck element 44 is raised to the top 28 of the trailer 20, the brackets 48 do not need to be used to secure the deck element 44 to the side walls 34, 34a of the trailer 20. When the deck element 44 is in this position, the length of chain between the deck element 44 and the pulley assemblies is minimal. This substantially prevents the deck element 44 from swinging or moving relative to the pulley assemblies. It is envisioned that the brackets 48 could be used when the deck element 44 is in this position, if desired.

When the deck element 44 is raised to the top 28 of the trailer 20, the ramps 88 and the brackets 48 can be stored on top of the deck element 44 in the U-shaped deck beams 96. This prevents the ramps 88 and the brackets 48 from being lost since the items are always stored within the trailer 20, even when not in use. In addition, this provides for the use of the ramps 88 and brackets 48 whenever the items are needed. When automobiles are being transported in the trailer 20, the ramps 88 can be stored underneath the automobiles on the floor or underneath the automobiles on the deck element 44.

Now directing attention to FIGS. 13–15, the bracket member 48 is described. The bracket member 48 projects inwardly from the side walls 34, 34a of the trailer 20 when attached thereto and is detachable therefrom. Each bracket member 48 is made of a suitable rigid, high strength material, such as steel. The bracket member 48 has a lower cam surface 140, an upper cam surface 142 and a flat surface 144 which integrally joins the cam surfaces 140, 142 together. The lower cam surface 140 extends inwardly and upwardly and the lower cam surface 142 extends inwardly and downwardly. The flat surface 144 joins the lower and upper cam surfaces 140, 142 at their innermost points. An aperture 146 is provided proximate to the flat surface 144 for attaching the end 108 of the lifting beam 98 thereto. When the end 108 of the lifting beam 98 is aligned with the flat portion 144 of the bracket member 48, a latch member 148, such as a pin, is inserted through aligned apertures (not shown) in the lifting beam 98 to secure the lifting beam 98 to the bracket member 48. A cotter pin 150, spring, or other like suitable means, can be attached to the pin 148 to prevent the pin 148 from slipping out from the aligned apertures in the end 108 of the lifting beam 98.

The lower cam surface 140 is inclined at a severe angle relative to the vertical axis and provides a surface upon which the end 108 of the lifting beam 98 travels when the deck element 44 is lifted by the lifting assembly 46. Since the deck element 44 is only slightly smaller than the width of the trailer 20, as the deck element 44 travels along the lower cam surface 140, the vertical side walls 34, 34a of the trailer 20 bow outwardly and laterally stress outwardly.

When the deck element 44 is placed between the cam brackets 48 on either end 108 of the lifting beams 98 with each end 108 of the lifting beam 98 engaging a bracket member 48, the vertical side walls 34, 34a maintain the bowed configuration as shown in FIG. 16. When the vertical side walls 34, 34a of the trailer 20 are laterally stressed outwardly, a significant amount of rigidity is added to the structure. The bowing of the side walls 34, 34a spring loads the deck element 44 therebetween and does not allow the deck element 44 to move laterally from side to side. The upper cam surface 142 of the bracket member 48 also provides a surface upon which the end 108 of the lifting beam 98 can travel when the deck element 44 is being lowered from a raised position.

As shown in FIGS. 10, 11 and 12, a plurality of spaced openings 152 are provided in a vertical row along the length of the side walls 34, 34a to which the bracket member 48 can be attached. The bracket member 48 and therefore the deck element 44, can be positioned at a variety of heights relative to the floor 26 of the trailer 20.

To attach the bracket member 48 to the openings 152 provided in the side walls 34, 34a of the trailer 20, the bracket member 48 includes an upper hook-shaped dog 154 and a lower hook-shaped dog 156, each of which are spaced from each other and which project outwardly from the surface of the bracket member 48 which is opposite to the cam surfaces 140, 142. Each dog 154, 156 has a length which is slightly smaller than the openings 152 in the side walls 34, 34a. The dogs 154, 156 extend through the openings 152 in the walls 34, 34a and a hook 158, 160 on each dog 154, 156 holds the bracket 48 to the side wall 34, 34a. When the dogs 154, 156 are attached to the walls 34, 34a, a space 157 is provided between the top of the dogs 154, 156 and the top of the opening 152.

To prevent the bracket member 48 from inadvertently detaching from the wall 34, 34a, a locking mechanism 162 for locking the bracket member 48 to the wall 34, 34a is provided on the lower dog 156. The locking mechanism 162 includes a pin 164 which is loaded by a spring 166. The pin 164 diameter is the same as the length of the space 157 between the top of the lower dog 156 and the top of the opening 152 in the side wall 34, 34a. When the bracket 48 is attached to the side wall 34, 34a and the dogs 154, 156 project through the openings 152 in the walls 34, 34a, the pin 164 is between the top of the dog 156 and the top of the opening 152 and fills the space 157. This locks the bracket 48 to the side wall 34, 34a and the bracket 48 cannot be removed from the side wall 34, 34a without unlocking the locking mechanism 162.

The spring 166 has an end which is attached to the pin 164 along the length of the pin 164. The opposite end of the spring 166 is attached to the inner surface of the lower cam surface 140 of the bracket member 48. Normally, the spring 166 biases the pin 164 into a locked position.

To remove the bracket member 48 from the wall 34, 34a, the pin 164 is retracted by pulling the pin 164 backwardly away from the side wall 34, 34a to overcome the biasing force of the spring 166. In the first embodiment of the bracket member 48 shown in FIG. 13, an enlarged opening 168 is provided in the side of the bracket member 48 around the center of the pin 164. A protrusion 170 for an operator's finger is provided along the length of the pin 164. In the second embodiment shown in FIGS. 14 and 15, the finger protrusion 172 extends through an elongated aperture 174 in the side of the cam bracket member 48 and is perpendicular to the pin 164.

To retract the pin 164 in either embodiment, an operator places his or her finger against the protrusion 170, 172 and pulls the pin 164 in a direction away from the side wall 34, 34a of the trailer 20 to overcome the biasing force of the spring 166. The pin 164 is pulled in a direction away from the side wall 34, 34a of the trailer 20 until the pin 164 clears and is removed from the opening 152. When the pin 164 is retracted, the end of the pin 164 which is opposite to the side wall 34, 34a protrudes outwardly from the lower cam surface 140 through an aperture in the surface as shown in FIG. 15. Once the pin 164 clears the opening 152, the bracket member 48 can be removed since there is sufficient clearance for the dogs 154, 156 to be lifted upward and outward with respect to the wall 34, 34a to clear the hook portions 158, 160 of the dogs 154, 156 and remove the dogs 154, 156 from the side wall 34, 34a.

While a locking mechanism 162 is provided only for the lower dog 156, the locking mechanism could be instead provided for only the upper dog 158. Alternatively, a locking mechanism could be provided for both dogs.

Cover plates 176 are mounted on the outer surfaces of the side walls 34, 34a over the openings 152 to prevent the entrance of dirt, moisture or the like into the interior of the trailer 20. Each cover plate 176 is secured to the outer surface of the side wall 34, 34a by suitable means, such as welding or by use of rivets or the like. While two separate cover plates 176 are shown, one single cover plate could be used for each two sets of openings or a single cover plate could cover all of the openings in the side wall.

While the deck element 44 is illustrated and described herein as being positioned against the floor 26 and the top 38 and at the midpoint of the trailer 20, it is to be understood that the deck element 44 can be positioned at a variety of positions relative to the side walls 34, 34a of the trailer 20 by lifting the deck element 44 to a desired position and then securing the ends 108 of the lifting beams 98 to the brackets 48. For example, the deck element 44 could be lifted to be three-quarters of the way up the side walls 34, 34a of the trailer 20. This would allow for smaller cargo to be placed on top of the deck element 44 with larger cargo underneath on the floor 26. For example, lawn mowers could be placed on top of the deck element and minivans could be placed underneath the deck element. Thus, if two sets of automobiles were shipped across country in the trailer 20, once the automobiles are offloaded from the trailer 20, the deck element 44 can be repositioned to provide space for a variety of cargo, such as the minivans and lawn mowers. Therefore, the trailer 20 does not have to be sent back across country empty since it can be configured to transport other items than automobiles.

Now directing attention to FIG. 17, a fore and aft deck retaining assembly 178 which is connected to the front end of the deck element 44 is illustrated. The fore and aft deck retaining assembly 178 prevents the deck element 44 from moving forwards towards the front wall 30 of the trailer 20 or backwards towards the end doors 36 during transportation of the trailer 20.

Vertical rails or channels 180 are provided in the nose 182 of the trailer 20 which is adjacent to the front wall 30 of the trailer 20. Each upstanding channel 180 includes a vertical opening 184 along the length of the channel 180. The channel 180 may be made of metal and the nose 182 of the trailer 20 may be made of plywood.

For each vertical channel 180 provided in the nose 182 of the trailer 20, the deck retaining assembly 178 includes a guide assembly 186 which is attached to the vertical channel

180. The guide assembly 186 includes a nylon insert 188 having a first end which is seated inside of the vertical channel 180, a second end which is seated outside of the vertical channel 180 and a middle portion. The middle portion of the nylon insert 188 is enclosed in a slide or anti-friction pad 190 and the combination is seated within the opening 184 in the channel 180. The nylon insert 188 and the surrounding slide pad 190 are is approximately the same width as the opening 184 in the vertical channel 180.

A slide or anti-friction pad 192, 194 is attached to the first and second ends of the insert 188. First and second slide plates 196, 198 are attached to the first and second ends of the insert 188, respectively, and abut against the respective slide pads 192, 194. The slide plates 196, 198 are secured to the ends of the insert 188 by suitable means, such as bolts (only one of which is shown). The slide pads 190, 192, 194 used in the fore and aft deck retaining assembly 178 are of a conventional, well-known structure. The slide pads 190, 192, 194 allow the insert 188 to easily slide upwardly and downwardly in the vertical channel 180. Alternatively, rollers could be used instead of the slide pads.

A rigid, stiffener member 200 is attached to the second slide plate 198 around generally the second end of the insert 188. A rigid, tension post member 202 extends from the end of the stiffener member 200 opposite to the one secured to the slide plate 198 to the front end of the deck element 44. The tension post 202 is attached to the plate 198 and the deck element 44 by suitable means, such as by welding. Thus, the fore and aft deck retaining assembly 178 provides a rigid interconnection between the deck element 44 and the nose 182 of the trailer 20 and resists forward and rearward movement of the deck element 44 relative to the floor 26 during transportation of the trailer 20. The fore and aft deck retaining assembly 178 also fixes the distance between the deck element 44 and the nose 182 of the trailer 20 and stabilizes the deck element 44 while it is being raised. When the deck element 44 is raised or lowered by the lifting assembly as described hereinabove, the slide pads 190, 192, 194 allow the insert 188 to slide easily relative to the vertical channel 180.

The novel trailer 20 of the present invention presents several advantages. Since the cargo is only loaded and unloaded once due to the novel trailer 20 capability of being transported by road or by rail, a reduced amount of labor is needed to transport the cargo to the final destination which reduces transportation costs. Also, the possibility of damage to the cargo is also minimized since the cargo is not repeatedly loaded and unloaded. Furthermore, the cargo is transported from the plant to the final destination in a enclosed trailer which also minimizes the possibility of damage to the cargo.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A vehicle for transporting cargo comprising: an elongated structure including a floor and upstanding opposite side members; a deck member supported within said structure for receiving and supporting cargo, such as automobiles, and movable relative to said floor of said elongated structure; a lift mechanism for supporting said deck member in said elongated structure, said lift mechanism raising and lowering said deck member relative to said floor of said elongated structure, said lift mechanism being substantially horizontally arranged along an upper margin of each said side member such that when said cargo is loaded onto said deck member and said deck member is raised, said lift mechanism does not interfere with the space occupied by said cargo on said deck member in said elongated structure, and wherein said lift mechanism comprises a rotatably mounted screw member, a threaded member movable along said screw member upon rotation of the screw member, and a plurality of elongated flexible elements operatively interengaged with said threaded member and connected with said deck member for moving the deck member relative to the floor of the elongated structure, said screw member being horizontally arranged along the upper margin of one of the side members of the elongated structure and said flexible elements being vertically arranged and proximate to the side members of said elongated structure such that when an automobile having a roof is loaded onto said deck member and said deck member is raised, the screw member does not contact the roof of the automobile.

2. A vehicle as defined in claim 1, wherein said lift mechanism includes two screw members, each said screw member being horizontally arranged along the upper margin of one of the side members of the elongated structure such that when said automobile is loaded onto said deck member and said deck member is raised, the roof of the automobile is positioned between the screw members.

3. A vehicle as defined in claim 2, wherein said elongated structure has a predetermined width and said lift mechanism further includes a gathering beam member which generally extends across the width of the elongated structure, said threaded member being interengaged with said gathering beam member, said screw members being engaged with said gathering beam member and rotatable relative thereto, said gathering beam member being moved to a position which is forward of the roof of a forwardmost automobile in said elongated structure when said automobiles are loaded onto said deck member and said deck member is raised such that said gathering beam member does not contact said automobiles on said deck member.

4. A vehicle as defined in claim 3, wherein each said flexible element comprises a chain, each said chain having an end operably connected to said rotatable screw member and an opposite end connected to said deck member, said lift mechanism further including a plurality of pulleys mounted adjacent the upper margins of said side members of said elongated structure, each said chain passing around at least one pulley.

5. A vehicle as defined in claim 4, further including a drive motor connected to said screw member.

6. A vehicle as defined in claim 3, wherein said vehicle is a plate trailer.

7. A vehicle for transporting cargo comprising: an elongated structure including a floor, a front member and upstanding opposite side members, each said side member having an upper margin; a deck member supported within said structure for receiving and supporting cargo, such as automobiles, and movable relative to said floor of said elongated structure; a lift mechanism for supporting said deck member in said elongated structure, said lift mechanism raising and lowering said deck member relative to said floor of said elongated structure such that said deck member can rest on said floor or can be raised to a variety of positions off of said floor including a position which is substantially proximate to said upper margins of the side members, said lift mechanism being substantially horizontally arranged along said upper margins of said side members and further being substantially proximate to said front member and said side members such that a central portion of said elongated structure is substantially unencumbered by said lift mechanism such that when said cargo is loaded onto said deck member and said deck member is raised, said lift mechanism does not interfere with the space occupied by said cargo on said deck member in said elongated structure, said lift mechanism comprising at least one rotatably mounted screw member, a threaded member movable along said screw member upon rotation of the screw member, and a plurality of elongated flexible elements operatively interengaged with said threaded member and connected with said deck member for moving the deck member relative to the floor of the elongated structure, said screw member being horizontally aligned along said top of the elongated structure and said flexible elements being substantially vertically aligned along the side members when said deck member is in a position other than proximate to said top, and wherein said flexible elements are substantially horizontally aligned along the top of the elongated structure when said deck member is proximate to said top.

8. A vehicle for transporting freight comprising: an elongated structure including a floor and upstanding opposite side members; a deck member supported within said elongated structure for receiving and supporting cargo, said deck member being movable relative to said floor of said elongated structure and movable to be proximate to an upper margin of said side members; a lift mechanism for supporting said deck member in said elongated structure, said lift mechanism raising and lowering said deck member relative to said floor of said elongated structure; and a plurality of brackets releasibly mounted on said side members for securing said deck member to said side members, said brackets being removable from said side members, wherein when said deck member is raised so as to be proximate to said upper margin of said side members, said side members of said elongated structure are generally unencumbered by any structure so that general freight can be easily loaded onto the floor of said elongated structure and said brackets are removed from said side members and stored on top of said deck member so as to leave the interior of said elongated structure unencumbered, said lift mechanism comprising at least one rotatably mounted screw member, a threaded member movable along said screw member upon rotation of the screw member, and a plurality of elongated flexible elements operatively interengaged with said threaded member and connected with said deck member for moving the deck member relative to the floor of the elongated structure, said screw member being horizontally aligned along the upper margin of one of said side members and said flexible elements being substantially vertically aligned along the side members of said elongated structure when said deck member is in a position other than proximate to said upper margin of said side members, wherein said flexible elements are substantially horizontally aligned along the upper margin of the elongated structure when said deck member is proximate to said upper margin of said side members of said elongated structure.

9. A vehicle as defined in claim 8, wherein said elongated structure has a predetermined width and said lift mechanism further includes a gathering beam member which extends across the width of the elongated structure, said threaded member being mounted on said gathering beam, said screw member being rotatably attached to said gathering beam member.

10. A vehicle as defined in claim 9, wherein each said flexible element comprises a chain, each said chain having an end operably connected to said rotatable screw member and an opposite end connected to said deck member, said lift mechanism further including a plurality of pulleys mounted adjacent an upper margin of said side member of said elongated structure, each said chain passing around at least one pulley.

11. A vehicle as defined in claim 8, wherein said vehicle is a plate trailer.

12. A vehicle as defined in claim 8, further including ramps removably positionable between said floor and the ground for facilitating loading cargo into said elongated structure, and wherein when said deck member is raised to be proximate to the upper margins of said side members, said ramps are removably stored on top of said deck member so as to avoid encumbering the interior of said elongated structure.

13. A vehicle as defined in claim 12, wherein said deck member includes channel structure for receiving tires of automobiles to be transported, said channel structure receiving said ramps when said deck member is raised to be proximate to the upper margins of said side members.

14. A vehicle as defined in claim 8, wherein said deck member includes channel structure for receiving tires of automobiles to be transported, said channel structure receiving said brackets when said deck member is raised to be proximate to the upper margins of said side members.

15. A vehicle as defined in claim 14, further including ramps removably positionable between said floor and the ground for facilitating loading cargo into said elongated structure, and wherein said channel structure further receives said ramps when said deck member is raised to be proximate to the upper margins of said side members.

* * * * *